United States Patent [19]
Nyman

[11] 3,858,518
[45] Jan. 7, 1975

[54] ELEVATED TRANSPORT SYSTEM

[76] Inventor: Alexander Nyman, 43 Bretton Rd., Dover, Mass. 02030

[22] Filed: Mar. 27, 1972

[21] Appl. No.: 238,446

[52] U.S. Cl.................. 104/88, 104/18, 104/20, 104/135, 104/173, 198/38, 104/124
[51] Int. Cl............................................ E01b 25/22
[58] Field of Search......... 104/88, 89, 96, 105, 130, 104/131, 147, 148; 198/38

[56] References Cited
UNITED STATES PATENTS

| | | | |
|---|---|---|---|
| 2,745,542 | 5/1956 | Boots | 104/173 |
| 3,590,743 | 7/1971 | Larson | 104/88 |
| 3,610,160 | 10/1971 | Alimanestianu | 104/88 |
| 3,626,857 | 12/1971 | Omar | 104/89 |
| 3,631,806 | 1/1972 | Barthalon | 104/89 |

Primary Examiner—M. Henson Wood, Jr.
Assistant Examiner—D. W. Keen

[57] ABSTRACT

An Arctic Transport system which consists of a monorail track, supported by pylons at relatively short intervals, and a conveyor chain riding on the track. The conveyor chain consists of self propelled trolleys travelling at constant speed over a course with a direction reversing element at each end. Load units are accelerated by automatic means and attached to these trolleys at definite insert stations. These loads are removed at specific exit stations as controlled by automated signals and brought to stop or to any other transport system by automated controls. The load units are charged with materials to be transported at loading stations by automated loading mechanisms, preferably with turnstile arrangements. These units are subsequently inserted into the transport chain and attached to trolleys by automated logistic mechanism.

15 Claims, 30 Drawing Figures

Patented Jan. 7, 1975

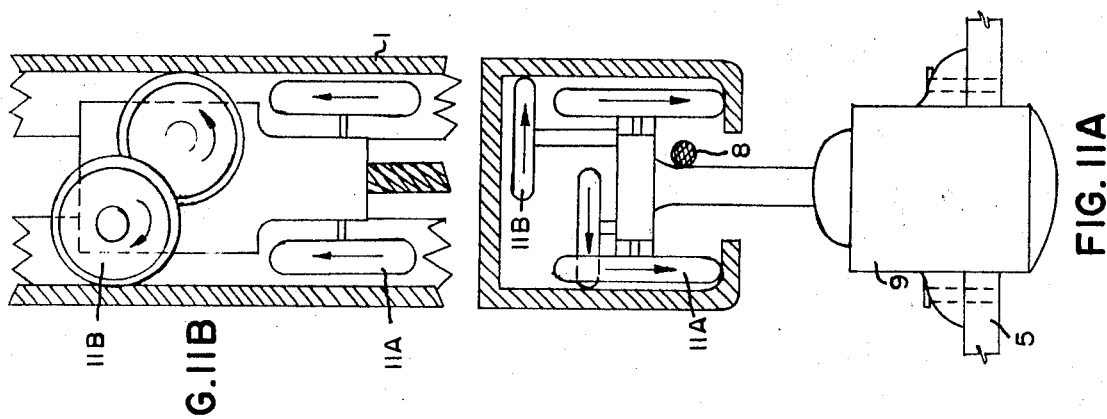
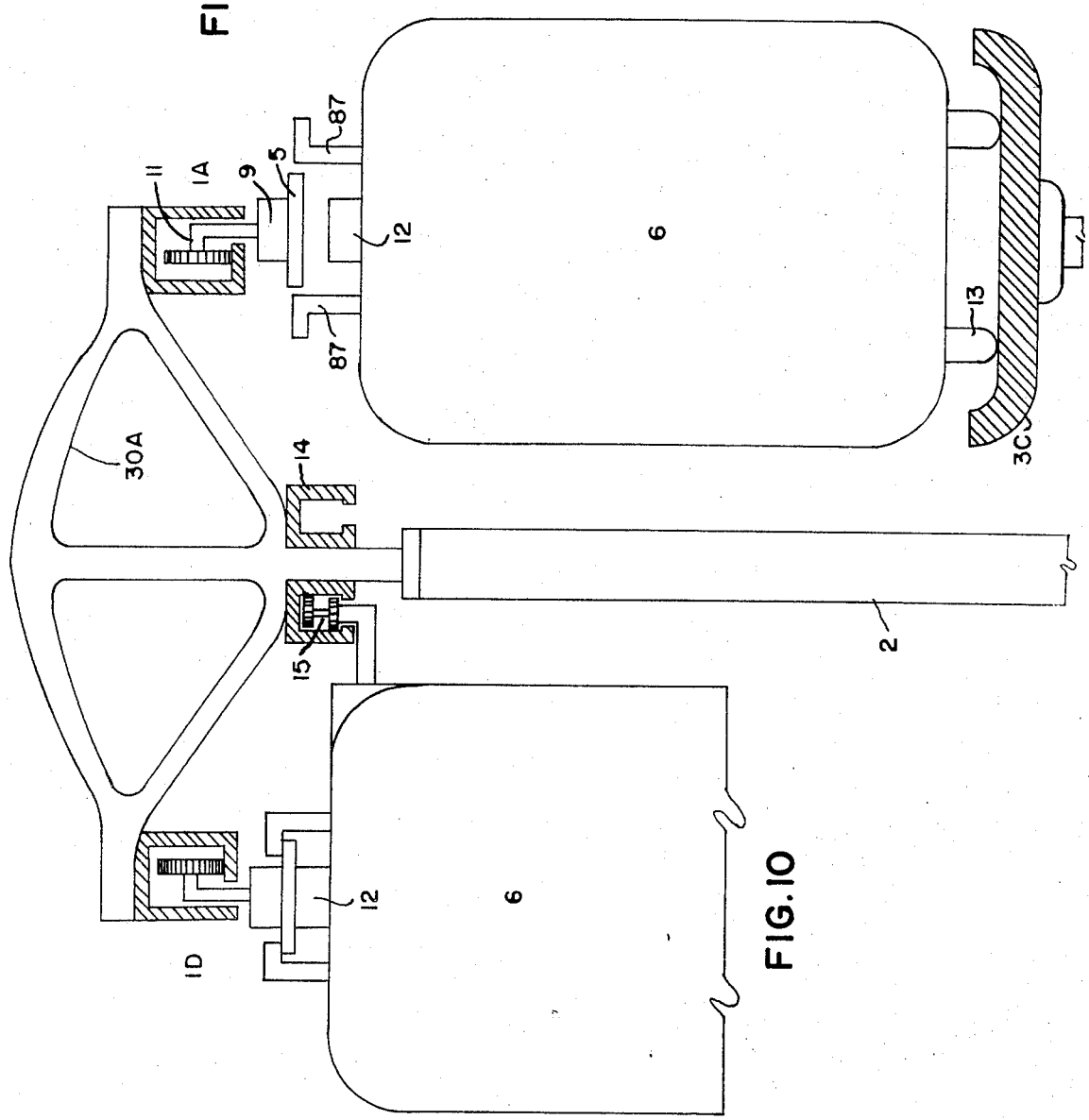

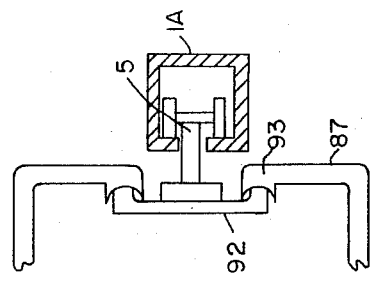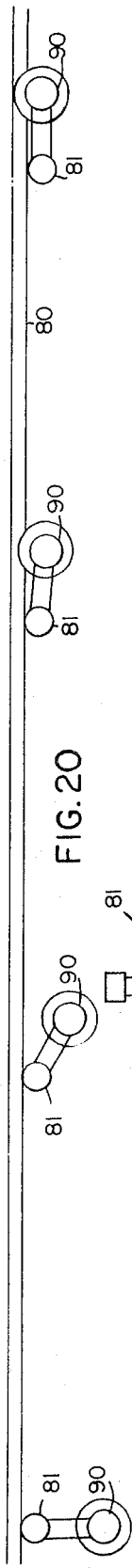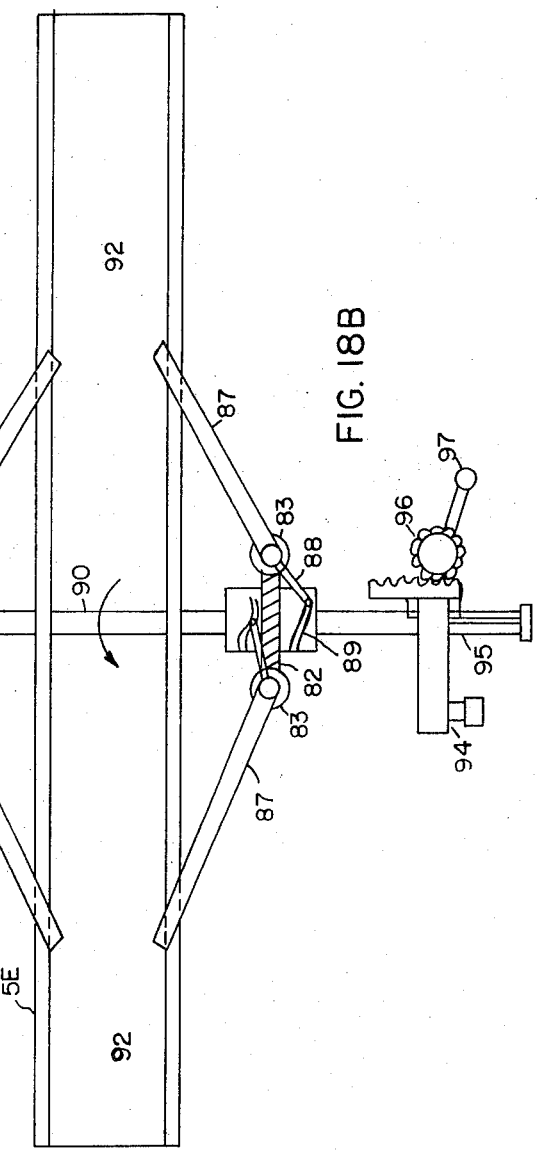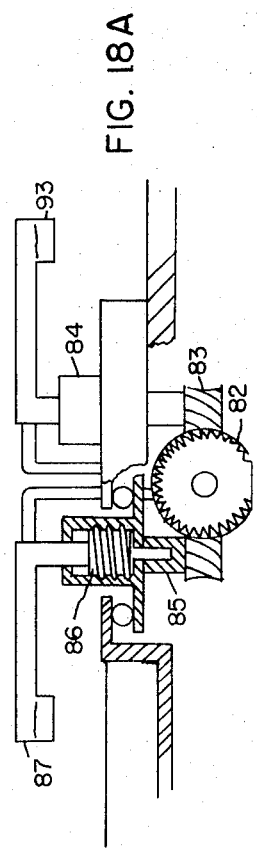

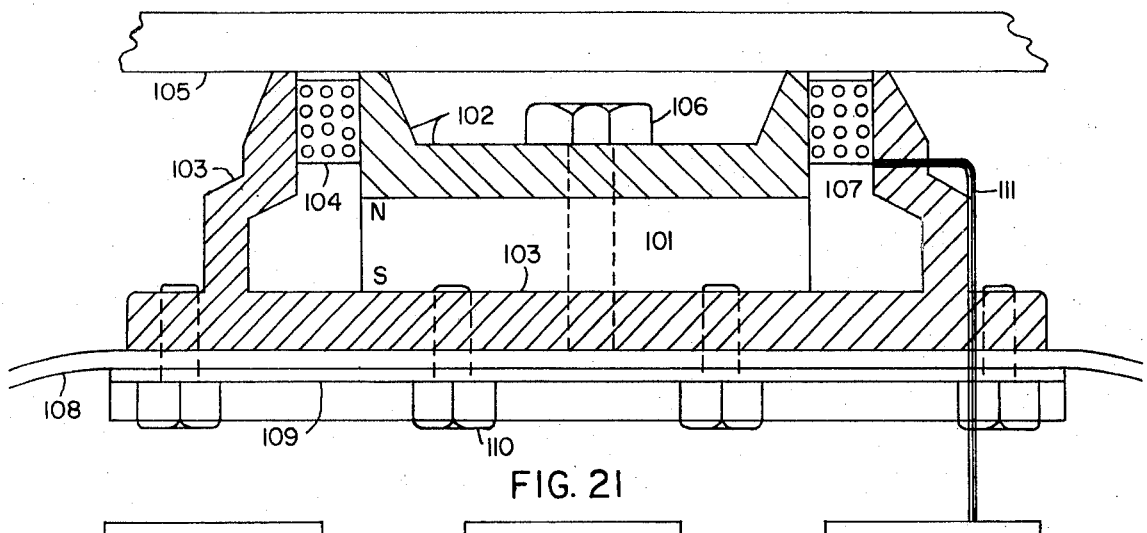
FIG. 21
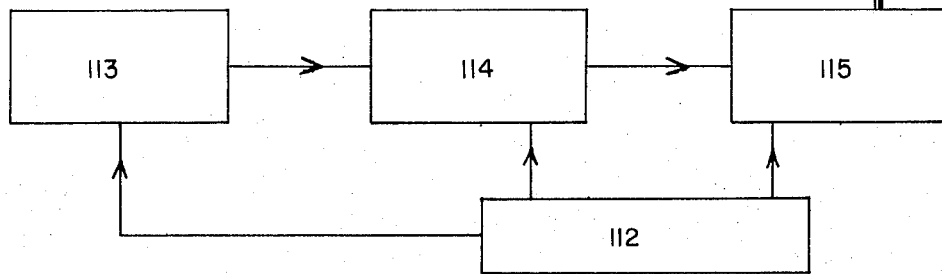
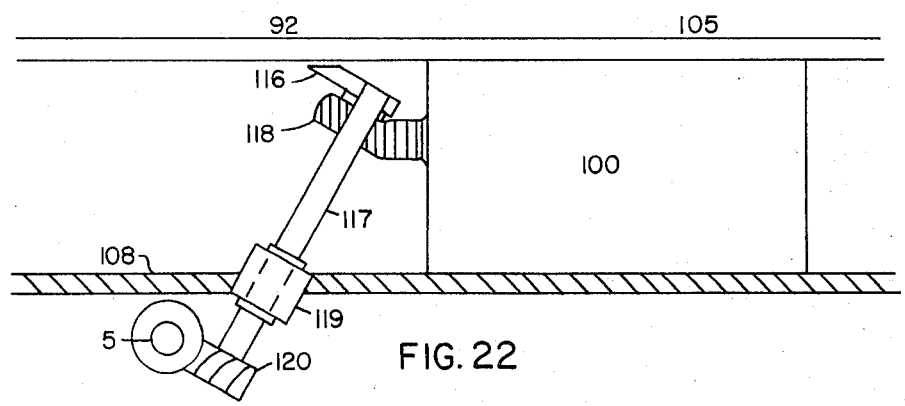
FIG. 22
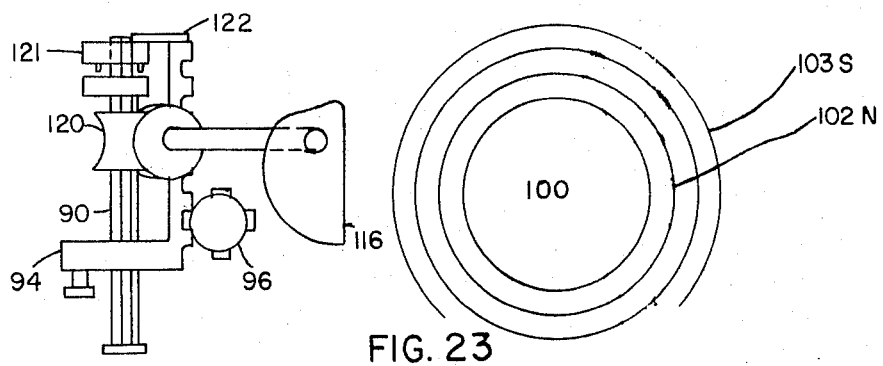
FIG. 23

ELEVATED TRANSPORT SYSTEM

BACKGROUND OF THE INVENTION

This invention relates to a transport system generally described as a conveyor and more particularly to a conveyor with practically all of the operating elements automated. Thus the loading operation, the speed of travel, the transfers and the unloading operations are carried out by automation mechanisms preset for the specific desired performance.

Heretofore the conveyor systems such as conveyor belts or conveyor buckets have fixed elements in a conveyor mechanism, with the load placed directly on such conveyor and removed at destination. A certain degree of automation may have been included into the loading and unloading arrangements. While performing useful service in most cases, it is unsuitable for arctic conditions where the areas carrying loads are subject to severe atmospheric precipitation.

An entirely different concept of loading and unloading under automated controls, including accelerating and decelerating conditions is provided in this invention. This new process of loading applies also to passengers when they are the load. Mere covering of the track and the conveyor does not remove the weather hazards at extremely low temperatures and snow-storms except for the very expensive tunnel or pipe arrangement. Even then, conditions in arctic, such as "perma-frost" and earthquakes, may have disastrous ecological effects. Neither is clearing of the track as with railroads by a snow plow, practical for a conveyor. This invention has special snow removal mechanism integrated in the conveyor system.

OBJECTS AND SUMMARY OF THE INVENTION

This invention may be considered as an improvement in mass transportation. From the invention of boats and transport vehicles the progress of mass transportation has been in the direction of achieving higher speeds and larger passenger capacity of such vehicles.

I propose an improvement which will retain the high rate of passenger delivery but permit vehicles of small size, (yet not independent as automobiles) to be used as units of a transportation system capable of handling great numbers of passengers, safely and without interference with other modes of transportation. The new concept is an automated conveyor.

This new system of transportation includes the following elements, the combination of which accomplishes the objects of this invention. Some of these elements are well known in the art of transportation, others are new ideas, as applied to transportation of passengers at relatively high speed. A description of a preferred form for these elements is given below but other elements to achieve the same purpose may be used within the scope of this invention as defined by the claims.

In accordance with the principles of this invention, the load — either material or human — is placed in transport units: cabins for humans, containers for materials. The loading of these units takes place while they are at stand-still or very slow motion. The loading of containers may be also entirely separate from the specific transportation drive, either by conventional systems of loading materials or by some automated arrangement as explained below. The unloading takes place with similar conditions.

After loading, the transport unit is placed under the control of an automation device which accomplishes the following effects: acceleration of load unit and insertion into the transport system, transportation to destination at constant speed or transfer to coordinated similar transport system, and release and deceleration at the destination. Automation may also include several emergency functions.

The transport system — the conveyor — includes preferably an elevated track with a return track parallel to it. This track can be supported at definite intervals by suitable pylons as is usual in monorail systems.

This permits a continuous high speed travel track, for suspended vehicles, which move at a constant speed. This track carries a continuous series (or chain) of small load supporting elements called trolleys. The trolleys travel at constant speed, never leaving the track except under special and emergency conditions. The spacing of these trolleys is maintained preferably by two redundant means: interconnecting cables and an electric synchronizing system based on individual drive motors on the trolleys.

These trolleys carry also coupling elements for attaching the load units, preferably in redundant fashion: mechanical coupling and a new type of magnetic coupling as described.

The propulsion of the trolleys is preferable with redundant means. The interconnecting cables are driven by suitable motors at booster stations. The trolleys are passed in an automated way from one propulsion cable to another. The redundant propulsion is an electric motor on each trolley adequate to transport only one trolley load. This motor has such speed-load characteristics, as to resist strongly any difference of speed from the precisely defined travel speed. This synchronizing function assures freedom from longitudinal disturbing oscillations of travel units.

To start a transport operation, each load unit is placed on a moving track and kept stationary by automated stop elements. When a trolley for the load unit is available, as indicated by automatic controls, the load unit is allowed to move along with the track and accelerates. The preferred arrangement for this is a brake mechanism and a travelling belt at a speed equal or slightly above track speed. This brake on the load unit is completely released during standstill. When the automatic control releases the load-unit stop, the brakes are applied by an automatic acceleration control device, so as to bring the load unit directly under the available trolley. The automatic control then permits the coupling device to attach the load unit to the trolley. The load unit is hence travelling at a fixed system speed to the destination or a transfer station.

At the destination, as determined by preset controls, the automatic controls call for release of the load unit. This call can be exercised by a specially indexed number for each station. Pre-setting of this number will identify the destination of each load unit. At the destination, mechanical, optical, electric, magnetic or any other type of index identification, operates automatic means, to release the load unit from the trolley. The load unit is then placed on a stationary ramp. Its brakes are then controlled by an automatic deceleration control device, to arrive and stop at the desired unloading location.

In case of transfer to another track, the load unit may be placed on a moving belt and controlled automatically to the correct speed and location of the trolley of the new track for recoupling to the new trolley. The same arrangement may be used at booster stations if needed. Both accelerating and decelerating functions of the automatic speed controls are preferably recorded on a magnetic tape and identified as control pulses in reference to pulses obtained from the load unit during its period of velocity change. These reference pulses may be generated by stationary markers (mechanical, optical or magnetic) on a special member along the track and some suitable reading device.

The cooperation of a series of pulses from the predetermined tape record and the above pulses from track members, determine by a suitable electronic system of comparison the operation of the brakes. The brakes then exercise a velocity change (i.e., acceleration or deceleration) to conform to the preset schedule, and bring the load unit to the insert location at or near the exact speed. Then the coupling mechanism is activated and the load unit can proceed at conveyor speed.

For arctic use of the automated conveyor, the suspension rail with enclosed track gives best protection against snow and ice deposits. In addition it may have exterior plastic covering with pneumatic inflation means for this covering. This system of ice removal has been used successfully on airplane wings. Various means of periodic inflation can be used: either by timed pump operation or by a series of explosive charges along the track activated by the automated control system.

Further snow and ice protection of tracks in arctic regions can be provided by enclosing the track in a suitably designed snow screen which is more likely to become iced than any other part of the structure. When the snow and/or ice accumulation on the screen exceeds the safety limit, a special defrosting unit is sent through in the same way as any load unit. This defrosting unit may consist of a fuel reservoir, with a number of burners, which will heat the screen or other elements and loosen their ice burden. Following the burners a set of hammers will hit the screen at selected areas to throw off the excess snow and ice burden.

For arctic use this conveyor may require a special loading system integrated with the automatic controls. A preferred arrangement would be a turnstile with the containers passing successively under the turnstile for individual loading during about each one-half revolution of the turnstile. The rate of turning of the turnstile and the complete loading of the containers is integrated into the general automatic controls. A number of such loading systems can be integrated into a single conveyor system.

At the destination the automated conveyor system of this invention requires a sequential ordering mechanism. As the successive load units are released at rates as high as one per second on the same decelerating track, the automatic controls direct the slowed down load units to one or more station platforms where the unit can be unloaded. Provisions are made in the automatic controls to remove the empty load units to a reloading platform. The load unit may be also transferred to some other type of transport such as a road trailer or ship.

The units after loading are dispatched by automatic control whenever an empty trolley is available. When the number of waiting empty load units exceeds a preset limit, the automatic controls will maintain the logistics of the conveyor system by placing the empty load unit on available trolleys.

The load units are stabilized against oscillations caused by aerodynamic and other forces during travel. The stabilization in the direction across the track may be by special guide rails. The stabilization around an axis across the track is achieved by double suspension to each trolley at opposite ends. The longitudinal stabilization (in the direction of the track) is achieved by providing a type of propulsion unit on each trolley which is extremely sensitive to changes in velocity of traction, such as electric synchronous motors. The track itself is banked at each turn to an angle needed for the constant speed of travel. The trolleys are interconnected by cables to form a substantially fixed conveyor chain. These cables can be used as a redundant propulsion means. For this purpose power input stations activate the cable at definite distant intervals of the chain. This activation is accomplished by detaching one cable from the trolley, while another cable is attached to it. The detached cable is passed over a drive pulley and can then be used for propelling trolleys which are travelling in the opposit direction on this reversing conveyor chain.

This system of transport can be used also for mass transport of passengers such as commuters in a city or within the city. For this purpose the initiation of travel of passengers and their destination choice is accomplished by automatic means, controlled by passengers. The transfer of passengers from one line of transport to another is also automated and assures the minimum delay for this transfer.

BRIEF DESCRIPTION OF DRAWINGS

FIG. 10 shows an elevation view of a simplified overhead track with stabilizing devices for aerodynamic and centrifugal disturbances.

FIG. 11A and FIG. 11B show the details of a propulsion trolley used with the suspended conveyor arrangement.

FIGS. 18A and 18B are side and plan views of a mechanical clutch for attaching the load containers to the overhead track.

FIG. 19 shows an end view of the mechanical clutch attachment to the trolley of the conveyor system.

FIG. 20 shows a cam bar along the track for operating the mechanical clutch.

FIG. 21 shows a magnetic clutch used as an alternative or as a redundant arrangement with the mechanical clutch.

FIG. 22 shows an arrangement for redundant operation of mechanical and magnetic clutch.

FIG. 23 is a plan view of the redundant arrangement of FIG. 22.

DESCRIPTION OF THE PREFERRED EMBODIMENT

Figure 1:
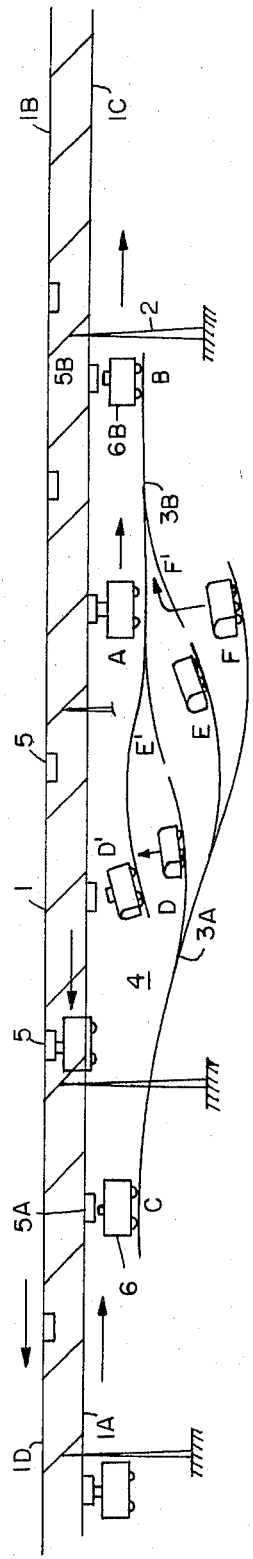
FIG. 1 is an illustration in schematic form of the principal elements of a preferred embodiment which achieves the objective of an automated conveyor for transporting passengers.
Figure 2:
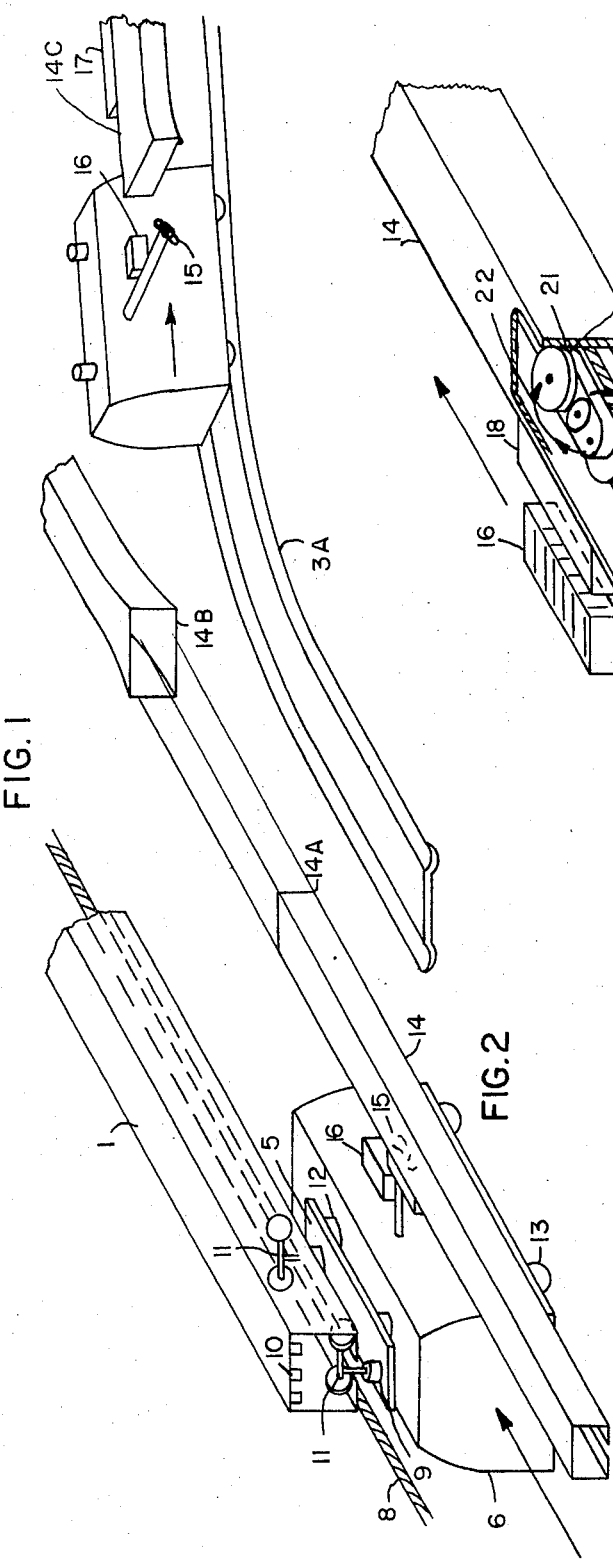
FIG. 2 is a detail illustration of the main track and guiding track.
Figure 3:
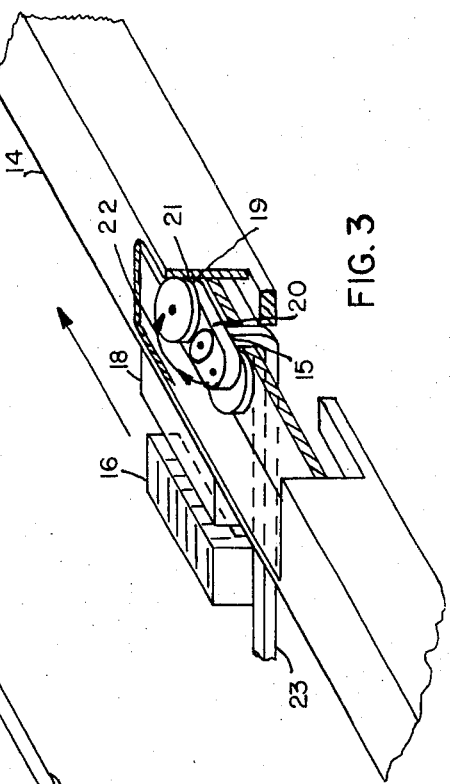
FIG. 3 is an enlarged detail illustration of the elements for automated velocity and attachment controls shown in FIG. 2.

FIGS. 1, 2 and 3 illustrate in a concise way the principle of operation of the automated transport conveyor as applied to the transport of passengers. They show also the technical features related to the essential operating elements. FIG. 1 shows right hand and left hand tracks 1, integrated into a ladderlike framework, which is supported on pylons 2. The right hand track is shown with an exit ramp 3A. The point C of this ramp is directly under the track 1. It shows also an entry ramp 3B, with the point B also under the track 1. Similar ramps, not shown, may be located with exit and entry points under the left hand track.

These ramps branch out into several station platforms, such as D, E, F at station 4. The illustration shows the entry platforms D', E', F', directly above the exit ramps. This arrangement is quite advantageous for handling large numbers of passengers with lower level for outgoing passengers and upper level for incoming passengers. An alternative station arrangement with horizontal transfer of vehicles from exit location to entry location is shown in FIG. 15. The rate of flow of vehicles and the speed of loading and unloading of vehicles for goods or containers determine the particular station arrangement. Even one continuous unloading and loading platform may be used.

FIG. 1 shows also a continuous chain of "trolleys" 5. These trolleys are the operational elements of the conveyor chain, travelling at constant speed. The chain may include the trolleys on both right hand and left hand tracks. Suitable reversal and power supply elements referred to as "boosters" are described in reference to FIG. 25. and are not shown in FIG. 1. They may be located at any suitable point of the track.

The trolleys 5 are used to support the load containers 6. These containers are attached to the trolleys at point B of the entry ramp 3B, and released at point C of the exit ramp 3A. After the release the container (or passenger vehicle) travels on ramp 3A under automatic control to a selected platform D, E or F, at the station 4. It is unloaded at this platform. The arrow 7 shows how the unloaded container 6 is raised by an elevator or some other means to the corresponding entry platform such as D', E' or F'. The container vehicle is loaded there. At a given signal the container, for example on platform F', is advanced automatically to the starting point A of exit ramp 3B. The automation logistic releases and accelerates the container to the full velocity of the chain along the ramp 3B from point A to point B. The automation system to be defined below, places the container then directly under an empty trolley such as 5B. A signal determined by location and velocity of the container, then activates the attachment or "coupling" mechanism to include the container in the conveyor chain. Suitable coupling mechanisms are described in reference to FIGS. 18 to 21.

FIG. 2 illustrates how a typical trolley 5 travels in the track 1. The trolleys are interconnected by tow cables 8, to form a chain. This chain may be propelled at constant speed by the "boosters." A redundant propulsion may be furnished by individual motors 9 on each trolley. Selection of suitable electric motor, such as synchronous alternating current motor, will assure, in addition to redundant propulsion power a longitudinal stabilization. Such stabilization is essential in any long travelling chain or train of vehicles. [see e.g. Myklestad: "Fundamental Vibration Analysis" (pages 237 to 243) which defines the dynamic and constructional conditions for such oscillations.] The synchronous motor is extremely sensitive to velocity variations. Even a minute alternating current phase displacement causes a large change in driving torque and corresponding energy losses. It is therefore very effective for reducing and damping such oscillations. For long distance separation of several miles between booster stations such suppression of oscillations is essential to assure the reliability of operation. In a measure it is equivalent to the solid linkage between the elements of conventional conveyor chain.

The trolley 5 is shown with two widely separated wheel axes 11, riding on the inside lips of the track 1. This track is shown as a boxlike double rail structure. There is a slot on the lower surface of the box. The lips adjacent to this slot form the two rails and may be covered by suitable wear-resistant material. The double rail is a redundant feature of this transport system. A single rail would be quite effective as in usual monorail systems. Such an arrangement is shown in FIG. 10. The boxlike rail structure may be manufactured as an aluminum extrusion. The relatively low load of individual containers and the constant speed operation over relatively smooth track with firm lateral guidance as described below permits the advantages of this manufacturing process and the facility of installation of the relatively light complete track frame as shown in FIG. 1. by helicopters. Constructional features of the frame and track are described in connection with FIGS. 6, 7, 10 and 12.

This boxlike rail track can enclose also the electric power leads 10 for the trolley motor 9. The connection is made by suitable sliding contacts not shown. Either single phase or multiphase power appropriate to the motor may be furnished through these exposed electric lines. They need only be correctly insulated from the inside of the box. They are thoroughly protected from atmospheric moisture deposits. In addition a number of well insulated signal leads may be attached to the tow cable 8. Suitable outlet sockets can be then furnished at each trolley for connecting to the operating elements of automation control on each load container, if needed.

Figure 24:
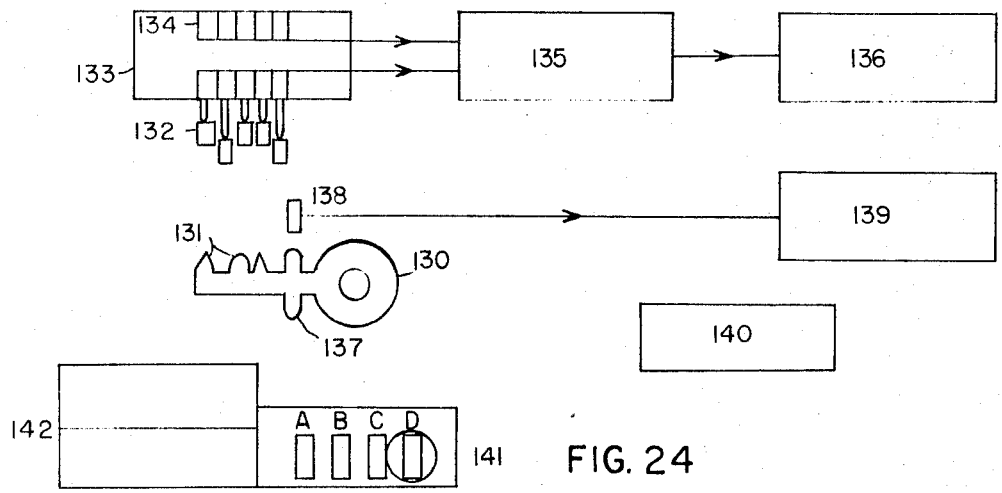
FIG. 24 shows the manual controls for the automated traction and velocity controls of the conveyor.

For passenger travel and internal cabin controls, sockets or transformer connections as described in connection with FIG. 24 are essential. They are also needed for heating and air conditioning as well as lighting within the passenger cabin. In the case of material transport, considerable simplification and possibly, under some circumstances, the elimination of container connections can be envisaged.

FIG. 2 shows the passenger cabin 6 suspended from the trolley 5 by two coupling devices (12), which are described in detail in connection with FIGS. 18 to 21. These coupling devices are preferably arranged each one in redundant manner. For example, if the magnetic clutches fail the mechanical will hold and vice versa. The passenger safety is thereby enhanced. Such redundant arrangement is shown in FIGS. 22 and 23.

FIG. 2 shows the cabin 6 furnished with a set of wheels 13. When not attached to the transport chain, the cabin will travel on these wheels either on exit ramp 3A or on the entry ramp 3B. The velocity controls for the preferred type of automated conveyor is exercised by controlled application of braking torque on these wheels. This operation is described in detail in connection with FIG. 16.

FIG. 2 shows also the guide rail 13 at the side and parallel to the main rail. The purpose of this rail is to stabilize the cabin against side sway caused by aerodynamic effects or by centrifugal forces due to the curvature of the track. With a constant speed of travel the main track can be banked to the exact value determined by the speed and the radius of the curvature of the track. The entry and the exit into the curve are also set to the exact predetermined angle. Therefore there would be only a minimum of side sway due to centrifugal force. There is, however, always a possibility of oscillatory effects due to side sway caused by dynamic effects of wind and travel speed. These dynamic effects must be carefully considered for the rigid framework of the track, as illustrated for example in FIG. 6. The guide rail 14 is used for reducing and damping such oscillations. A stabilizing element 15, illustrated in detail in FIG. 3, mounted on the side of the cabin 6 and rides inside of the guide rail.

The same mounting can be used for probe elements for the system of automation. Element 16 of FIGS. 2 and 3 illustrate a bank of probes preferably magnetic, although optical or mechanical probes could be also used. The nature and operation of these probes will be discussed in connection with FIG. 3.

When the cabin arrives at the destination set by manual or automated controls, either before or during the travel, the probe or probes are used to read out the station signal and release the cabin by disconnecting the clutch mechanism. The cabin will then rest on its wheels on the exit ramp 3A. The guide rail has an open section near the release point at 14A. If the cabin has not been released at this station then the stabilizing element engages the next section of guide rail at 14B. The disconnected cabin, however, continues its travel on the exit ramp by inertia. It is guided either by the curvature of this ramp or its vertical gradient, so that the stabilizing element 15 is engaged by a guide rail at 14C. This exit guide rail is furnished with a velocity control bar 17 which cooperates with the probe element 16.

FIG. 3 illustrates the stabilizing and velocity controls associated with the guide rails. The stabilizing element 15, includes two freely rotating wheels 19, mounted on a pivoted bracket 20. A stiff torque-producing spring with some associated damping device 21 (friction discs or hydraulic plungers not shown) is located at the pivot and serves to hold the two wheels firmly against the sides of the guide rail as indicated by the arrow 22. The stabilizer supporting bar 23 is connected to the cabin 6 and prevents its sideways oscillations. The same bar supports the magnetic probes 16.

One or more of these probes are sensitive to a coded magnetic box 18, so that it will respond to the coded setup on the cabin. This operation is described in detail in connection with FIG. 24. Another probe will respond to magnetic setup in the velocity control bar 17 as described in detail in connection with FIG. 17.

In the preferred velocity control arrangement the entry ramp 3B is furnished with a similar velocity control bar, arranged for setting up gradually varying accelerations to assure passenger comfort during the period of acceleration. This acceleration is moreover arranged to bring the cabin directly under an empty trolley when the velocity of the cabin has reached the velocity of the trolley. The automation programming will then operate the clutch mechanism to attach the cabin to the conveyor chain.

The operations described in reference to FIGS. 1, 2 and 3, comprise a preferred form of this invention. It includes release and acceleration of loaded vehicle, coupling it with a minimum of jerk to the conveyor chain, subsequent uninterrupted, constant speed travel to destination or transfer station, release from the conveyor chain by automated signal and automated deceleration to the exit location. the particular elements serving these operational functions may be altered in accordance with the existing or changing technique, retaining this particular principle of automated conveyor operation.

The preferred embodiment of this conveyor system includes moreover arrangements and provisions for assuring the reliability of automated operation and the safety of eventual passengers, also of the comfort of these passengers. These provisions as defined by the claims constitute an integral part of this conveyor system rendering it viable for passenger service from a safety point of view and from climatic and financial viewpoints.

Figures 4, 5:
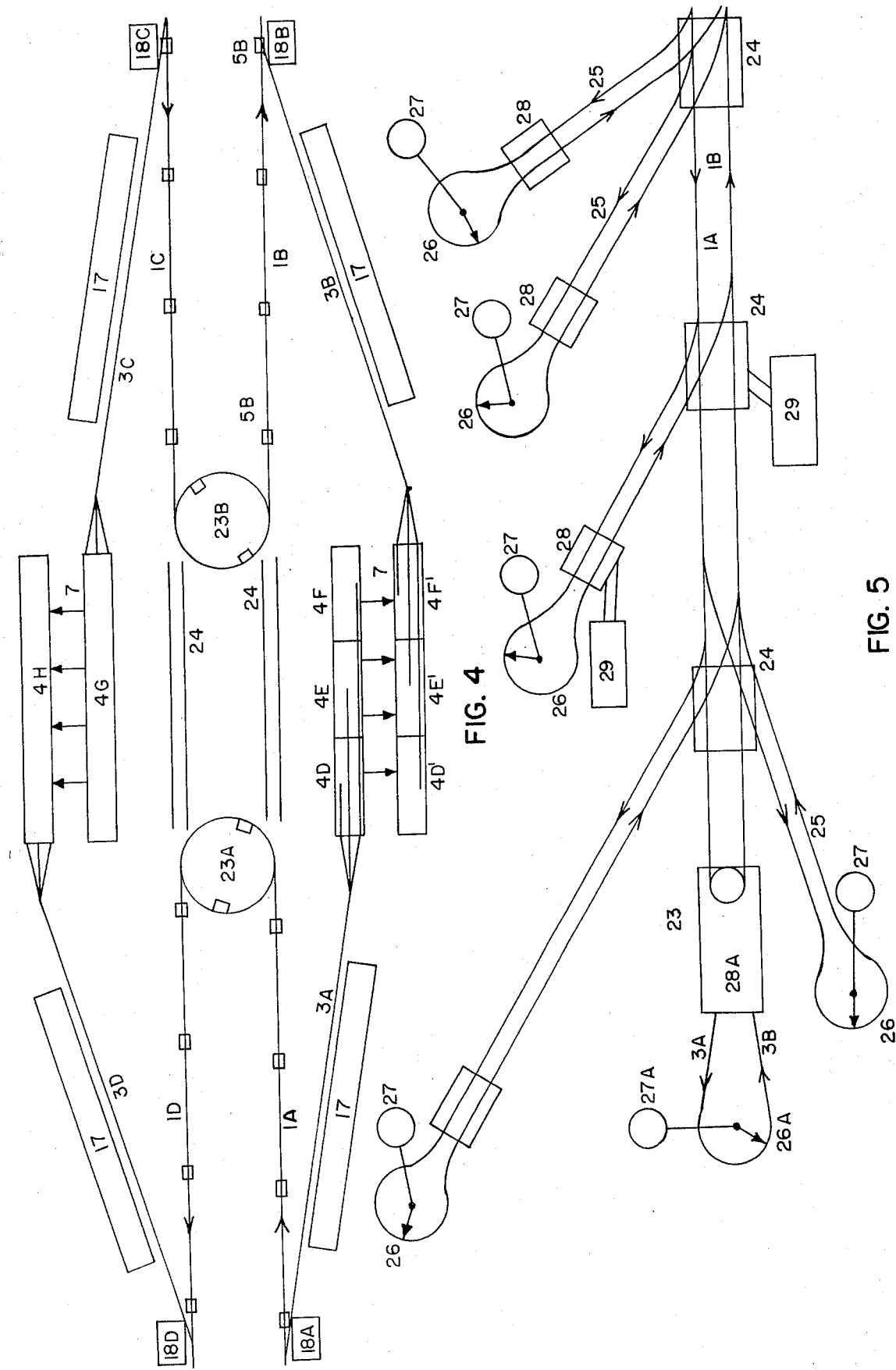
FIG. 4 shows schematically a track layout in reference to the elements of automation controls at a station used for passenger service.
FIG. 5 shows schematically track layout which may be used for transporting bulk material such as oil, where a number of oil wells in the same region receives transport service from a single large capacity conveyor system.

FIG. 4 represents schematically a track layout at a station such as indicated at 4 of FIG. 1. It shows also the transfer from one traction chain (IA) to another (IB) with the power boosters 23A and 23B respectively, described in detail with FIG. 25. This schematic is described in reference to normal operating functions as follows: The incoming tracks 1A and 1C have magnetic identification elements 18 set up for identifying the particular station 4. An approaching vehicle carrying the coded signal for this station is identified through its probe by automatic decoding system and operates the release of the vehicle at this track location. The vehicle is decoupled and placed on decelerating ramp 3A, to be delivered under automatic velocity control 17 to the unloading platforms 4D or 4E or 4F. When the vehicles are unloaded, elevators 7, operated by automatic or manual controls, raise the vehicles to the loading platforms 4D', 4E' and 4F' respectively. The arrow 7 may indicate in place of an elevator any other type of mechanical transfer mechanism from unloading to loading platforms. FIG. 15 illustrates such an alternative arrangement.

Figure 16A:
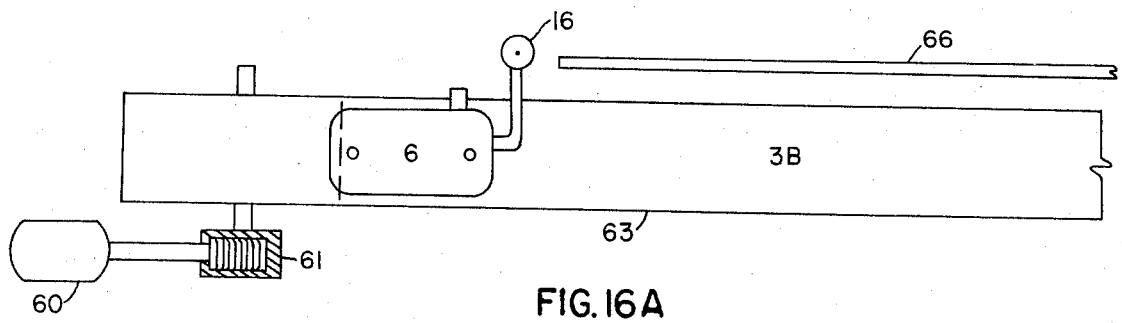
FIGS. 16A and 16B show schematically the layout of an accelerating ramp at the loading station with needed control elements.
Figure 16B:
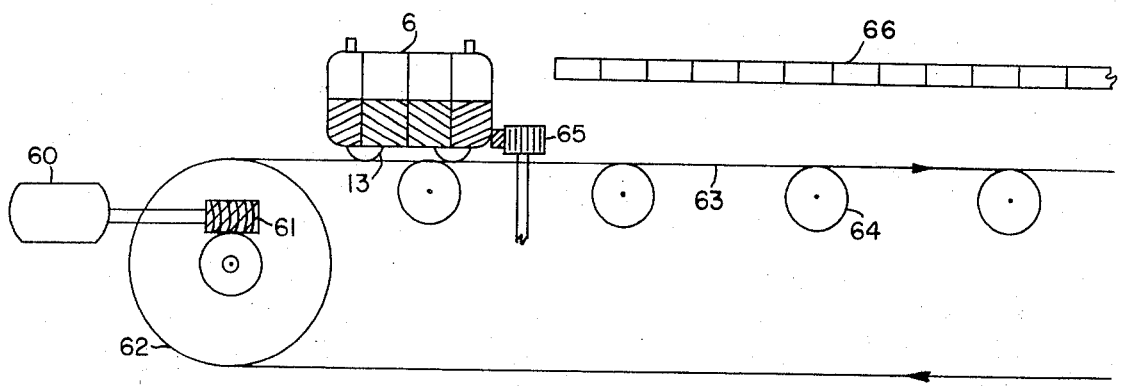
Figure 17:
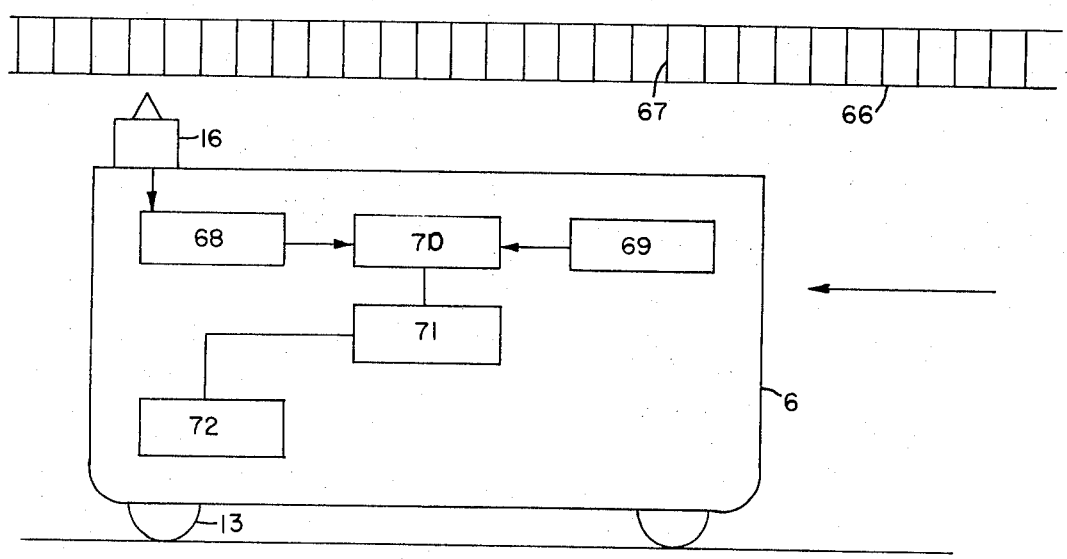
FIG. 17 shows the details of velocity controls used on accelerating and decelerating ramps.

When the vehicle has been loaded and is ready for dispatch, the automation system tracking the trolleys, selects an empty trolley such as 5B of FIG. 1, and releases the loaded vehicle on the accelerating ramp 3B. The velocity during acceleration is controlled by the automatic velocity control 17 associated with this ramp, with such an acceleration program as to place the vehicle travelling at full track speed directly under the trolley 5B. The vehicle is then coupled to this trolley by the automatic control, represented as 18B. The automation elements to accomplish these operations are illustrated in FIGS. 16A, 16B and 17 and described in detail with these Figures. The vehicle then proceeds along the track 1B to its specified destination.

The vehicles arriving at station 4 on the track 1C and identified for this station at 18C are similarly released and controlled on exit ramp 3C, stopped for unloading at platforms 4G, transferred to loading platform 4H and dispatched over entry ramp 3D to be coupled to track 1D.

The vehicles which are not identified for station 4 are transferred directly from track 1A to track 1B and from track 1C to track 1D. This is accomplished as follows: The booster wheels 23A and 23B pass the conveyor belt with trolleys from track 1A to track 1D, and from track 1C to track 1B. FIGS. 16A and 16B show the mechanism for vehicle transfer. FIG. 4 shows also that the vehicle is released from its trolley on incoming tracks 1A or 1C and placed on a vehicle transfer ramp 24. These transfer ramps maintain the vehicle at its constant speed until it is directly under a trolley on tracks 1B or 1D respectively. Automated coupling controls then attach the vehicle to its outgoing conveyor chain, i.e., to its trolleys. The two interlinked conveyor lines maintain synchronous operation. Normally such operation is at the same vehicle speed. However, when a change to different track grade calls for a different speed of travel, the two conveyor chains, while synchronous with regard to trolley timing, are arranged to travel at different speeds. In this case the transfer ramp 24 will change the speed of the vehicle accordingly. Such changes of speed can be carried out by the same kind of velocity control mechanism as is described in FIG. 17.

FIG. 5 illustrates another alternative arrangement for loading the units with oil, from several oil wells in the same region. For example with a daily capacity of 2 million barrels for the region a single conveyor system could carry this amount at say 30 miles per hour in 3 ton load units. FIG. 5 shows an incoming track 1B which may carry empty oil containers and an outgoing track 1C for the loaded containers. At a number of locations along the track, there are transfer stations 24 similar to those described with FIG. 4, which transfer a selected number and sequence of containers on each of the branch conveyor tracks 25. These tracks will lead to loading stations 26. These loading stations will include a load distributor for oil, similar for example to the turnstile used for ore loading described on p.345 of the book "Teleferique" by Z. Schneigert. This loading operation is entirely automatic and at a rate suitable for each particular oil well 27. Each loading station (26) may have decelerating ramps and its own automation devices to bring the containers from the conveyor chain to the loading station by unclamping and decelerating each container on ramps leading to the loading station 26 and again accelerating and coupling the filled containers to the outgoing track of the branch 25. These mechanisms are indicated as 28 in FIG. 5.

The conveyor tracks 1A and 1B may terminate near one of the principal oil wells 27A, with its own loading station 26A, and the needed exit and entry ramps 3A and 3B and the chief automation mechanism 28A. This location as well as any other transfer station 24 may have also passenger station arrangement as indicated at 29, similar to the arrangement of station 4 in FIGS. 1 and 4. The automation logistic control will select the appropriate slots in the conveyor chain to introduce the passenger vehicles.

Figure 6:
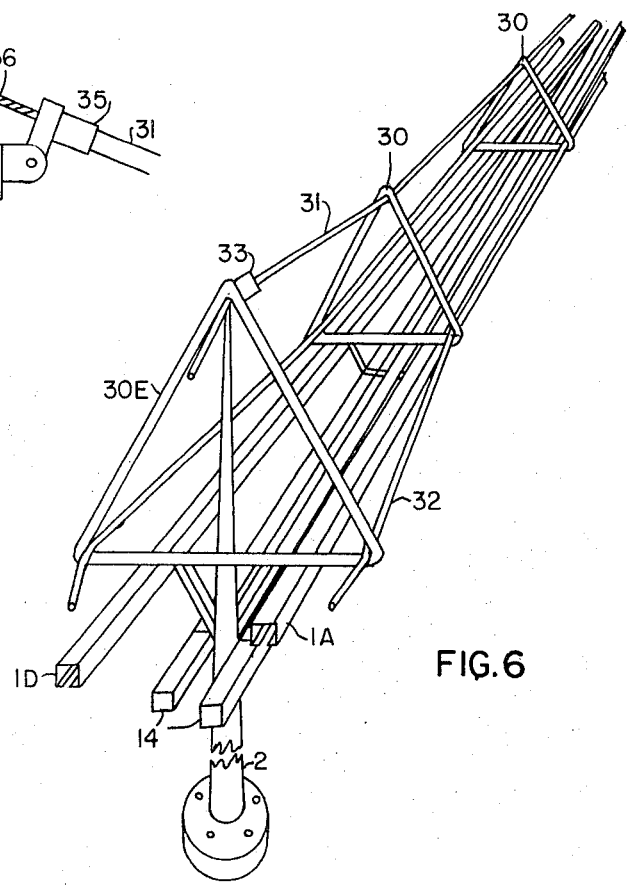
FIG. 6 shows a preferred form of track arrangement for suspended conveyor vehicles.
Figure 8:
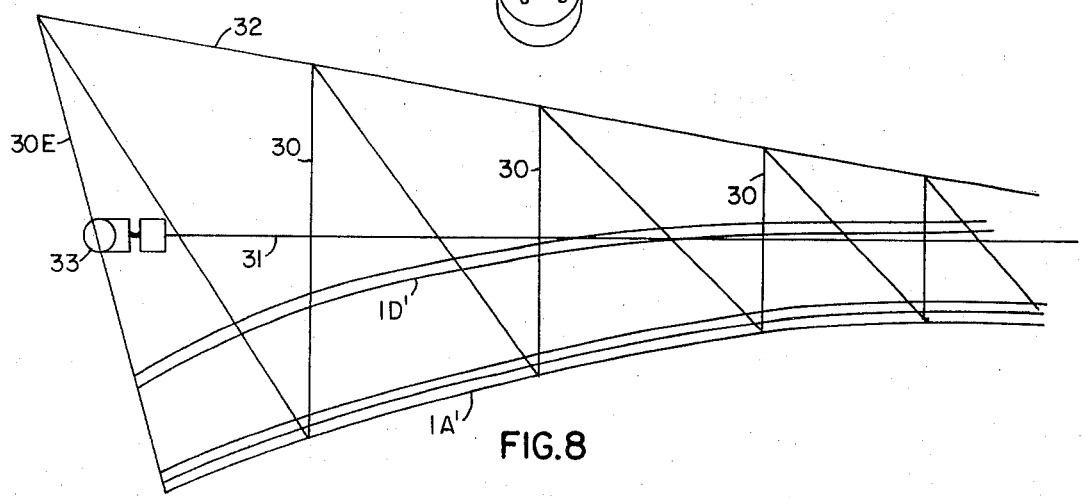
FIG. 8 shows some constructional details in a plan view of a rigidized framework for a curved section of track.
Figure 7:
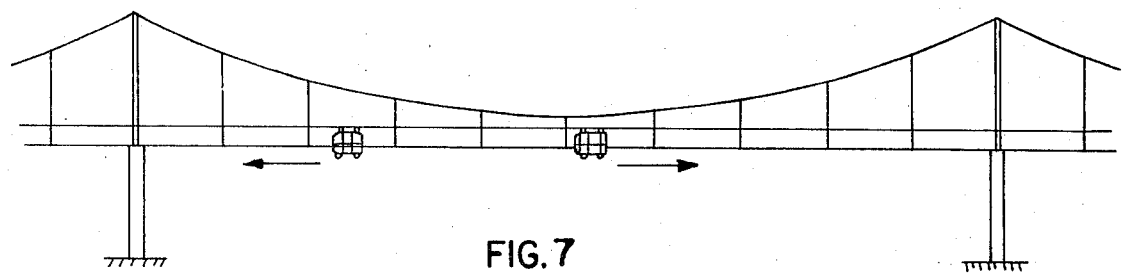
FIG. 7 shows the same arrangement as FIG. 6 as a side view span between two supporting pylons.

FIGS. 6 and 7 illustrate a preferred overhead track arrangement for the automated conveyor system of this invention. For long spans the arrangement shown provides a simple rigidized frame supporting two track rails, 1A and 1D, for example, for travel in opposite directions, and two guide rails 14. The frame consists of a series of triangles, 30 made preferably of aluminum tubing welded or otherwise fastened to the two track rails, preferably at fairly regular intervals. The dimensions of these triangles are arranged according to values calculated for a suitable catenaty curve. This curve represents the shape of a hanging chain, between two supports. The upper tie connections, 31, between the successive corners of the triangles are under substantially equal strain for normal uniform loading between the supporting pylons 2. The additional loads for travelling vehicles will then add approximately the same maximum increment on each tie connection as the vehicle passes from one triangle to the next one. Similar connections 32 on the two bottom corners, will serve similarly to equalize the maximum strains due to side winds and centrifugal forces on the turns. FIG. 8 shows a track layout on a curved section between pylons. it is envisaged that for normal construction, the track section length may be equal to one or one half distance between pylons. The sections can be then prefabricated to correspond to full length or a multiple of aluminum track extrusions 1A' and 1D'. The completed track section has such dimensions and weight that they can be transported by helicopter or truck to the installation location. The installation will then require only the fastening of one section to the next one and correct tensioning of the supporting ties 31. The end triangle (30E) may be attached in the factory to the pylon 2 at least on one side.

The rails will then be joined, preferably by hinge joints, designed to minimize the vehicle jerk and if needed including finger joint arrangement to take care of temperature variations.

Figure 9:
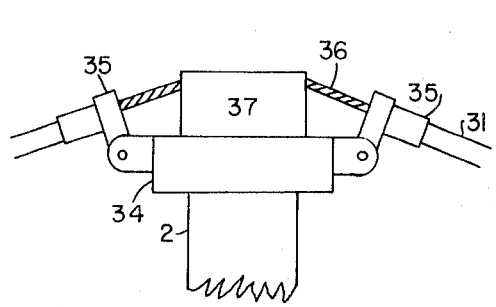
FIG. 9 shows a tensioning device used in the suspended track framework.

The weight supporting ties 31, will require tensioning to correspond to the precalculated force of the catenary curve. FIG. 8 shows the preferred location of such a tensioning device (33) at the top of end triangle 30E. FIG. 9 shows the detail arrangement of such a tensioning device. A cap 34 on the top of the pylon 2 has two hinged clamps 35 to the tension head 37, which can be designed for different tensioning on the two successive sections. This tensioning device may include a spring arrangement to take care of temperature effects.

This preferred arrangement can be simplified considerably in the case of relatively short sections. For very long spans, however, particularly when more than two sections are used on the span, a practical design may require a vertical suspension tie from the top of the triangle to a supporting cable. Such a vertical tie (not illustrated) would not add much to the torsional rigidity of the span and could be ordinary cable rather than a tube.

Since the disastrous collapse of Tacoma Narrows Bridge, the cause and the remedies of the torsional oscillations that caused it have been thoroughly studied. This type of oscillation could be present in the suspended structure of the conveyor track unless necessary precautions are taken. The relatively light structure and the succession of small cabins travelling at definite intervals, would be subject to periodic torsional forces due to side winds on the cabin side surface. These forces augmented by the speed of the cabin on the track produce torsional effects of periodic character. As a result there is a possibility that the periodicity in the structural elements along the track may produce disastrous resonance effects. The rigidized structural arrangement shown in FIGS. 7 to 10 is particularly suitable to reduce the periodicity, since the successive dimensions of triangles result in different natural frequency of the elements between the triangles. Mathematical verification for the possibility of oscillations has been worked out and is recommended before the practical use of any particular design. The tensioning of the suspension span is an element entering into such calculations. The adjustment of this tension as shown in FIG. 9 will help to arrive at the optimum tension from the point of view of possibility of torsional oscillations. Another element of design adjustment for the same purpose is to introduce a tension cable within the aluminum tubing used for this tensioning. The natural frequency of each element of the span depends on the distribution of tension of this particular element of the supporting tie. Any of the elements or all of them can be specifically clamped to such a cable to modify its particular natural frequency.

FIG. 10 illustrates a simplified triangular bracing, which can be used for relatively short spans between pylons. Economically such spans will prove less expensive and easier to install. Also the tendency for torsional oscillations is reduced. There could be only one vehicle on each span, and this span would be anchored firmly on two adjacent pylons.

FIG. 10 shows also the details for suspending the load containers. The pylon 2 is supporting the triangular element 30A.

The other triangles of each span are similar to 30A but unsupported except, as elements of the rigid frame, with the rails. The track 1A, 1D and two tracks 14 constitute the three corners of a triangular pyramid which is quite resistant to torsional and other deflections under load.

FIG. 10 shows the trolley 5 equipped with a single wheel on axis 11, with a similar wheel (not shown) on the second trolley axis 11 in line with the first. Such a trolley is therefore riding as a monorail traction element and must be stabilized laterally by the guide rail 14 with the stabilizing and damping element 15 as shown in FIG. 3.

Figure 12:
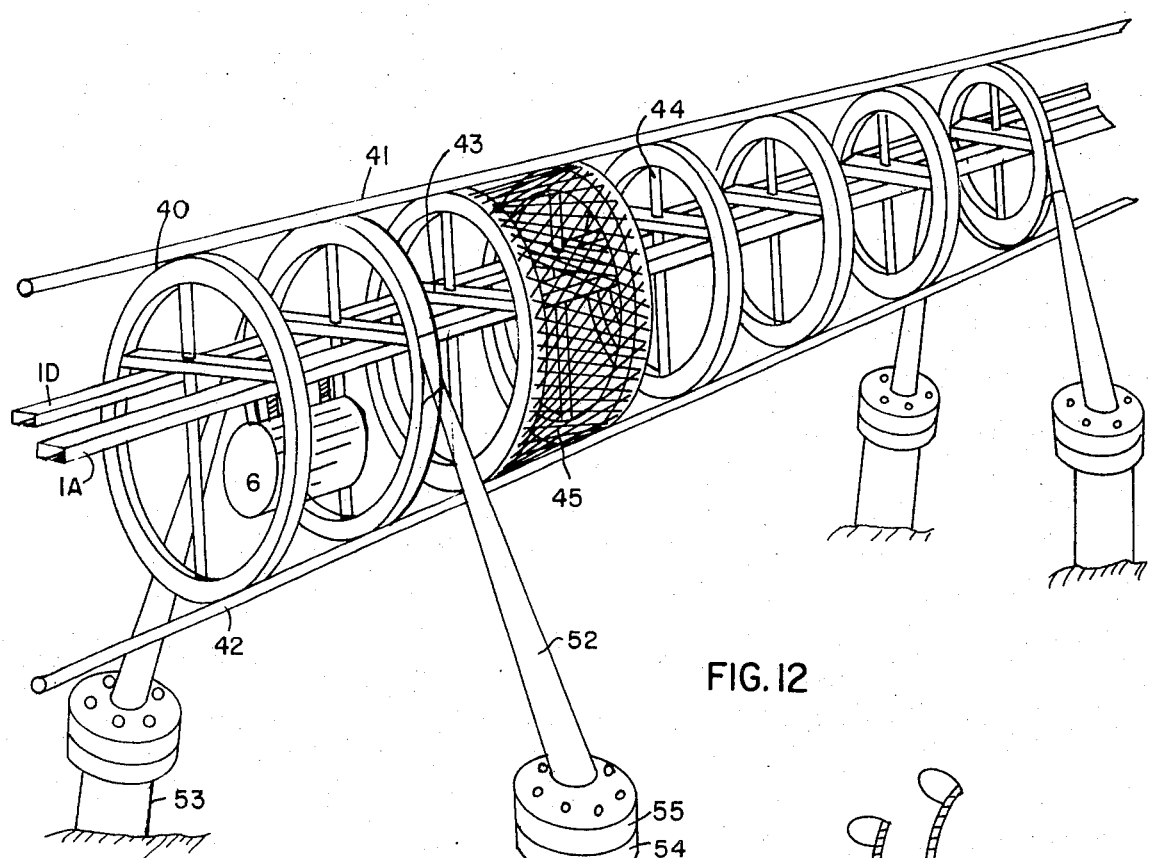
FIG. 12 shows an alternative track arrangement for use in artic climate with relatively heavy vehicles.

FIG. 12 shows also a magnetic clutch on each of the load containers. This clutch comprises a permanent magnet structure and an attracted plate such as 109. The location of these two elements of the magnetic clutch can be interchanged for convenience in providing the electrical connections for detaching operation. This figure shows also the hooks 87 as the elements of a redundant mechanical clutch, arranged to operate simultaneously and independently with the magnetic clutch. This assures the load container against the failure of either clutch mechanism during suspended travel.

The load container 6 is shown with wheels 13. When disconnected from the trolley the container rides on these wheels on the ramp, such as 3C and is subject to braking action on these wheels. For a stationary ramp, deceleration takes place. For a moving ramp such as a belt, acceleration can be obtained according to the amount of braking.

FIG. 11 shows an alternative propulsion arrangement for the trolley 5, riding in the track 1. In this arrangement the supporting wheels 11A may serve only to support the trolley in the track. Two horizontal wheels 11B on both ends of the trolley are arranged to run on the side walls of the track 1. They are furnished with propelling force by motor 9, similar to the motor of FIG. 2. However the output of this motor can now be applied directly to at least one of the wheels, while the others may be geared to it if needed. In this arrangement, the surface under the traction wheel 11B may be specially prepared for a maximum of tractive effort and a minimum of slippage, without excessive frictional loss. Even some form of rack and pinion treatment can be envisaged for example on steep slopes. In addition, any moisture that may find its way into the boxlike rail, will run down past this wheel and its rail, and is not liekly to freeze even under coldest temperature. This drive arrangement is particularly recommended for arctic use. The traction cable 8 is shown attached to the part of the trolley within the track 1. This redundant propulsion means is, therefore, also protected from climatic exposure.

FIG. 12 illustrates another alternative track construction suitable for the automated conveyor, particularly for relatively heavy loads of several tons in arctic regions. The tracks 1A and 1D are shown to be completely surrounded by a tubular framework, consisting of loops 40 and horizontal stays 41 and 42. A horizontal cross tie 43, supports the track rails 1A and 1D. A vertical tie 44 supports the two guide rails (not shown) as in FIG. 10. Such a framework has a high torsional rigidity, augmented further by tension elements 45.

The stays and ties could be preferably aluminum tubing, with sufficient compressional strength and buckling rigidity, to withstand the stresses due to relatively heavy loads. The tension element 45 would be preferably wires, to support tension loads. If steel wires are used they must be insulated from contact with aluminum and preferably clad with weather protecting material. Slight anodizing protection of aluminum tubing and aluminum extruded rails should be sufficient to protect this material even close to salt water areas. The tension wires 45, could be arranged into a meshwork pattern. In heavy snowstorms or under icing conditions, these wires would receive the bulk of snow or ice accumulation. Therefore the rails, traction cables and the moving elements will be freer from such deposits. In extreme cases the whole wire mesh could be surrounded with plastic or fiberglass sheets or close wire netting, giving complete tunnel protection to the conveyor elements.

Figure 13:
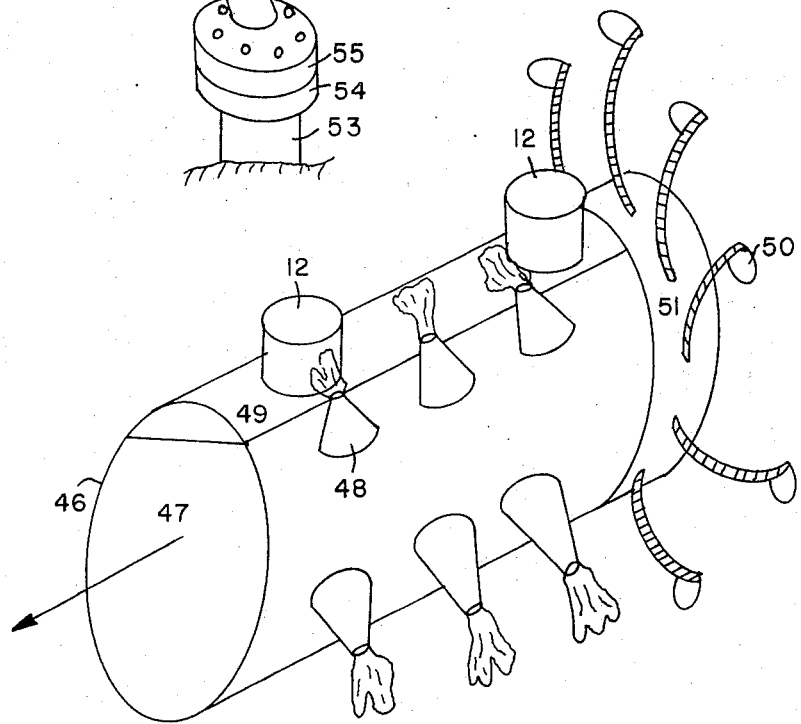
FIG. 13 shows a deicing module for the arctic conveyor arrangement shown in FIG. 12.

The accumulation of snow or ice under arctic or sub-arctic conditions may form in certain locations, quite heavy deposits. In order to remove such deposits before the tubular structure collapses a special traction module is placed in the conveyor system instead of a load container (6). FIG. 13 illustrates such a snow and ice removing module, 46. This module can be of the same weight as the normal loaded container and include as shown, a fuel tank 47 and suitable burners 48, with the controls 49. Experience may prove the need for adjusting the burner flames according to the amount and kind of ice or snow accumulation. The controls 49 can be then automated in relation to thickness of such accumulation.

The module has in addition sets of hammers (50) arranged to beat at the wire mesh supports after the ice has been loosened, thus causing it to be shaken off. The rate and amplitude of hammer strokes can be preset for optimum operation, either by the setting of controls 51 prior to launching the module or by some automatic means responsive to the icing condition. The module 46 is furnished also with clutch elements 12. The logic control for introducing and removing the deicing module can be introduced by manual control of supervising personnel or by preset probes of the degree of ice or snow accumulation on any portion of the conveyor track.

The tubular frame as described above in FIG. 12, would be preferably supported on double pylons 52 set at an angle to vertical, to best support the effect of strong arctic winds. Thus the tubular track frame and the ground are also in triangular formation well adapted to withstand the most severe climatic and even earthquake forces. The tubular pylons made of aluminum could be used. They could be either welded or otherwise fastened to the tubular frame, at the factory. Thus the double pylons or one pylon at each end could form a prefabricated unit to be delivered to the installation site. In the arctic permafrost, the ground support would consist of two posts 53 set in the usual manner into the frozen ground with base plates 54 at the correct distance and elevation to receive the base plate of the pylons 55.

Logistic Economy Study

Figure 14:
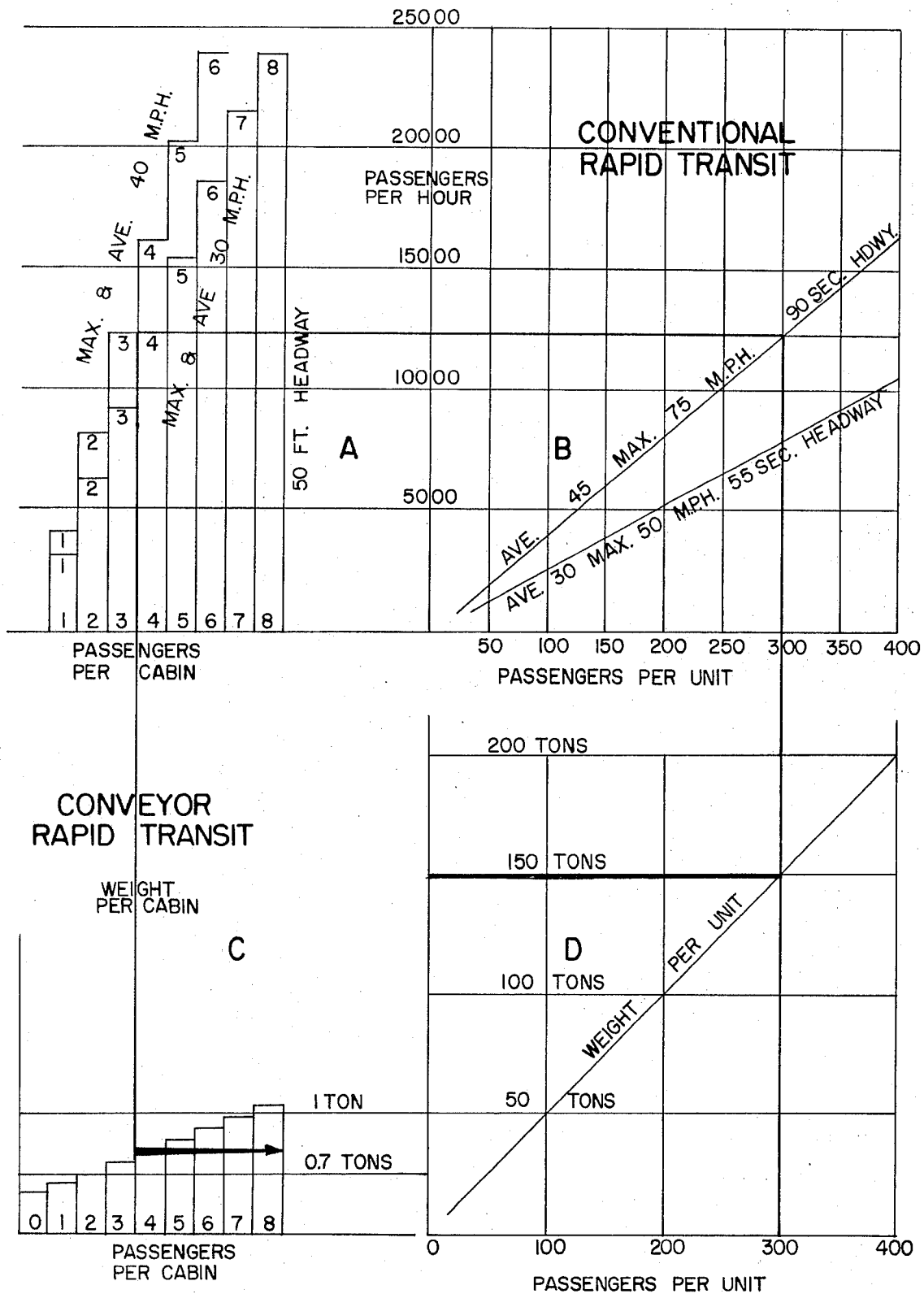
FIG. 14 is an explanatory diagram for the structural and economic advantages of a conveyor with the load subdivided in small units travelling at constant velocity.

Some specific economic advantages of this form of transportation when used for passenger movement as compared with the usual rapid transit railroad, either ground supported on in suspended monorail arrangement are illustrated in FIG. 14.

Section A of FIG. 14 shows the number of passengers that can be transported with the system of my invention with 50 foot cabin headway at 30 and at 40 miles per hour average, which is equal to maximum speed. With 4 passengers per cabin, 12,000 can be transported per hour at 30 miles per hour, and 16,000 at 40 miles per hour.

Section B shows the number of passengers per hour transported in conventional rapid transit trains at the same average speeds and suitable maximum speeds and headways between trains. A train carrying 300 passengers, travelling at a maximum speed of 75 miles per hour, with 90 seconds headway, will be needed in a system carrying 12,000 passengers per hour.

Section D shows how the weight of a conventional train varies with the number of passengers carried. The weight with 300 passengers per unit would be 150 tons.

Section C shows the weight of suitable conveyor cabins for different number of passengers. For 4 passengers the weight would be about 1,400 pounds, loaded, that is 0.7 tons.

It is quite evident that a track for 300 ton train, travelling at a maximum speed of 75 miles per hour, has quite different constructional and cost considerations from a track, carrying 0.7 ton cabins at 30 or 40 miles per hour.

On Chart D, the weight per transport unit, which may be a train or a single cabin in the conventional transport system, has a headway dictated by the need for stopping time. Even if this stopping time is eliminated, by shunting off the stopping unit from the main track, the headway is still needed to avoid the possibility of collision. The possibility of small cabin transport has been only realized in mountain cable transport, where the requirement of high speed does not enter and fully automatic cabin speed control has not been attempted.

These charts show the specific economic advantage of the invention system: as an example, a conventional system for 12,000 passengers per hour at an average speed of 40 miles per hour, will require a track carrying 150 ton units at a maximum speed of 75 miles per hour, with a minimum safe headway of 90 seconds. A very heavy track, either on the ground or of the overhead type, must be provided. With the proposed conveyor system the transport unit 0.7 tons (4 passengers), travelling at constant speed of 40 miles per hour with 1¼ second headway, will easily transport the required 12,000 passengers per hour. The track should be provided for 0.7 tons per unit, spaced about 70 feet apart and travelling at 40 miles per hour.

Figure 15B:
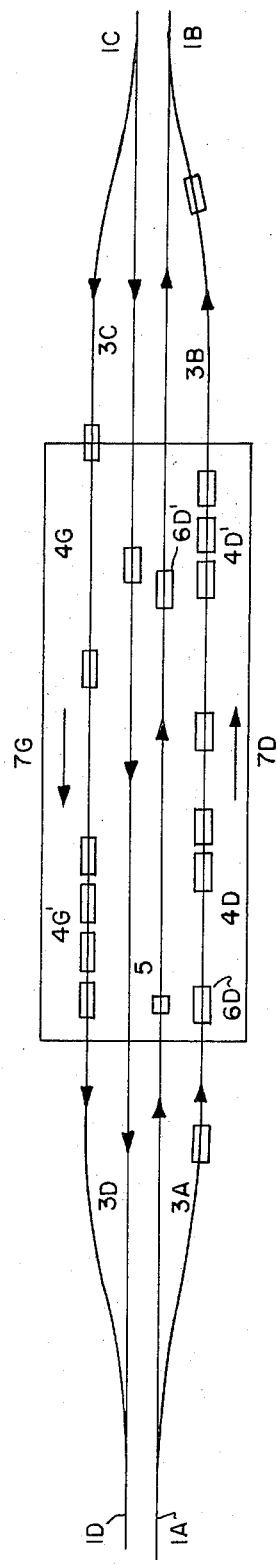
FIGS. 15A and B show an alternative track layout for a station with relatively low loading and unloading capacity, as compared with total load on conveyor arrangement.
Figure 15A:
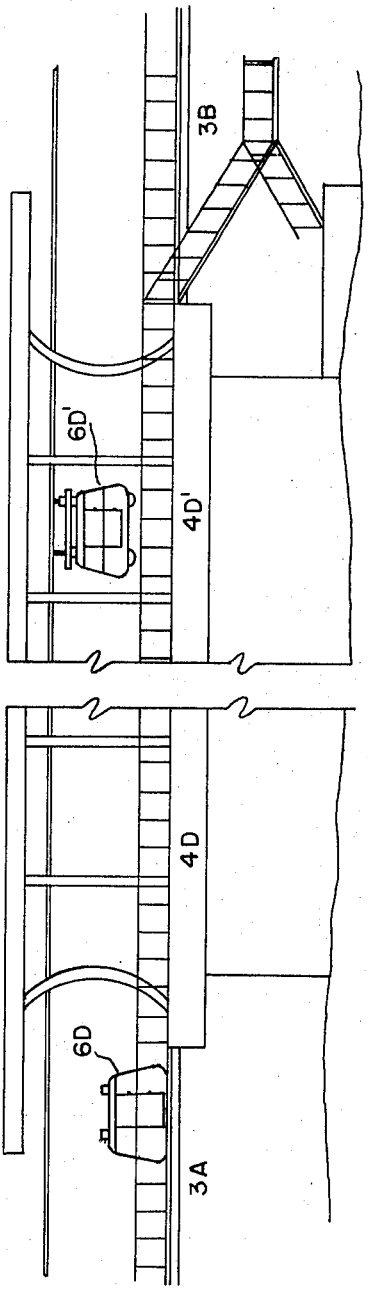

When the automated conveyor system of this invention is used for transport of passengers, for example in parks of city suburbs, the rather elaborate station arrangement shown in FIGS. 1 to 4 can be considerably simplified. FIGS. 15A and 15B show such a simplified system with the track arrangement which will permit loading and unloading on the same level. The figures are described with definite reference to numbers of passengers passing through such a station per hour in order to clarify the logistics of moving the passenger cabins from unloading to loading platforms.

As an example a passenger transport conveyor is considered capable of carrying 3,000 cabins per hour at, for example, 40 miles per hour. With 4 passengers per cabin, the maximum load will be 12,000 passengers per hour in each direction. Any one suburban station may never have a requirement for more than 4,000 passengers per hour or 100 cabins per hour. Therefore the automated logistic control will be arranged in such a way that there will never be more than 6 or 7 cabins at either platform of this station. Even if 28 passengers desire to travel as a group, their 7 cabins could travel at the maximum travel rate of 3,000 cabins per hour and be transported as a group within 3,600/3,000 × 7 = 8.45 seconds. This group can then step out of the cabins, and the cabins transferred to the loading platform in about a minute, leaving the entry ramp free for continuous low rate of transport of 36 seconds per cabin (100 per hour).

FIGS. 15A and 15B illustrate a station capable of loading and dispatching 100 cabins per hour. It is also capable or receiving the same average number of cabins per hour. Considering the traffic to the right on tracks 1A and 1B, there is a slow down ramp 3A and the speed up ramp 3B. The cabin controls and the accelerating and decelerating mechanisms would be similar to those shown in FIGS. 1, 2 and 3. The in-platform 4D is arranged to receive, for example, 7 consecutive cabins at seconds intervals. After unloading these cabins are transferred horizontally on the track 7D to an out-platform 4D′. There would be ample time available for unloading and transfer as explained below. At 100 cabins/hour 36 second intervals between cabins would be satisfied by a single space platform, if the passengers could disembark that fast. With 7 position platform there would be 7×36=252 seconds available at the average rate of transport. The loading platform could have a similar or lower number of available positions because, if transfer rate of arriving cabins calls for extra positions on the loading platform, then one or more cabins can be dispatched empty to clear the needed space.

Otherwise the dispatching will occur whenever one or more passengers have entered the cabin and closed the cabin door. Indications of destination can be also provided at this time by insertion of a coded ticket tab or key. This keying arrangement and the needed automation elements are described in connection with FIG. 24.

The arrangement for accelerating at the exit ramp (3B) and decelerating at the stations entry ramp (3A) under automatic control, can be carried out in a number of different ways, known in modern technology. A preferred arrangement for this purpose is shown in FIGS. 16A, 16B and 17. This provides for a minimum of electrical and mechanical equipment in the load container units 6 and is based on the use of an electronically controlled brake (not shown) on the wheels 13 of the load container 6. These wheels will rest on the entry or exit ramp. The exit ramp will be a belt (63) travelling at or slightly above the constant track speed. The brakes will bring the container up to the track speed at a location suitable for coupling to the available trolley (5B of FIG. 4). The automated control will assure this. At exit ramp the same brake mechanism and its control serves to decelerate the load container at some specified rate to bring it to a standstill at a specified platform (4D, 4E or 4F of FIG. 4).

FIG. 16A shows in plan view a cabin 6 on a launching ramp 3B which is a load supporting belt (63) driven by a mechanism shown in FIG. 16B. FIGS. 16A and 16B show a constant speed motor 60, driving through suitable gear mechanism 61, the drive wheel 62 carrying the belt 63. The belt is supported along its upper part on a series of rollers 64, for the full length of the exit or launching ramp. After the cabin is placed on this ramp by some transfer mechanism such as 7 of FIG. 4 or 7D of FIG. 15, it is held stationary on the ramp by a timed release mechanism 65. The release timing is controlled by automation logistics, in such a manner that the specified acceleration procedure will bring the cabin directly under an available trolley, such as 5B of FIG. 1.

The rate of acceleration after release is controlled by the application of brakes (not shown) on the cabin wheels 63. A speed control stationary bar 66, is located along the exit ramp 3B, similar to the control bar 17 of FIG. 2 on an entry ramp. A magnetic probe 16 is located on the cabin to cooperate with magnetic elements of the control bar 66.

A preferred arrangement of velocity control is illustrated in FIG. 17. The speed control bar 66 is shown to consist of a series of iron bars or small blocks, 67 evenly spaced along the control bar 66. They may be embedded into a plastic bar 66 or mounted rigidly on a bar 66 made of any nonmagnetic material.

The magnetic probe 16, arranged to pass close to bar 66 is subject to magnetic influence of such ferro magnetic bars 67. For example, these bars 67 may be just pieces of iron. The probe (consisting of a magnetic element surrounded by an electric coil) will receive magnetic variations and produce electric pulses as it passes over the series of bars 67. The frequency of these pulses will be directly related to the velocity of the vehicle. These pulses are then amplified and shaped by the probe amplifier 68. A frequency record may be prepared for example on a magnetic tape and used on an electronic tape reader 69 to produce electric pulses similar in shape to the pulses received from amplifier 68. These pulses from 68 and 69 can be therefore compared with regard to frequency, by an electronic comparator 70. The difference in frequencies is then introduced as an electrical parameter into the differential amplifier 71. The output of this amplifier, as a control electric current, is then applied to the electrically controlled brake 72 on the vehicle being accelerated. This series of electrical operations by elements of the brake, well known in electronic and electrical technology, will with proper design keep the acceleration of the vehicle in direct accord with the recorded acceleration values on the magnetic tape. The distance to be travelled by the vehicle and its duration can always be the same to accomplish the placing of the vehicle 6 under the trolley 5 at full velocity of the track. Therefore a preset record for this function will always result in correct distance — time — velocity correlation. An accurate dynamic study of this operation, with regard to damping of possible oscillations and other disturbing factors, must be carried out to achieve successful and reliable operation, needed for an automated transport system. Mathematical methods for such studies are available to those skilled in this art.

As an alternative to recorded frequency tape 69, a frequency standard may be used. In this case the bars 67 are not evenly spaced but arranged in such a manner that the correct prescribed velocity at each point along the bar 66 produces the same frequency. The differential of these frequencies is then the measure of error and is applied to the brake control.

This arrangement for speed control in either manner can be used also for deceleration control on a stationary ramp such as 3A, or for a transfer operation such as shown as 7D and 7G of FIG. 15A, with a supporting belt 63 travelling at the maximum transfer velocity.

In all such systems of velocity control when used for passenger transport, it is essential to take into consideration passenger comfort. Any change in acceleration is felt by the passenger as a jerk. Careful designing of the frequency record 69, will assure that any changes in acceleration will be introduced with a minimum of jerk.

FIGS. 18A and 18B show a preferred arrangement of a mechanical coupling mechanism to attach the load units to the propulsion trolleys. The wide use of this type of automated transport conveyor includes transporting passengers as public daily service. The qualities of reliability and safety are therefore of paramount importance. Many alternatives coupling and uncoupling devices for overhead cables are used on mountain cableways and other overhead track transports with very considerable safety. They could be undoubtedly automated and engineered for maximum safety. For the ultimate reliability of a transport, modern technology, as illustrated by astronautical vehicles, utilizes the principle of redundancy. If one very safe element still fails, there is another, preferably of entirely different type to take its place immediately. For the clutching and holding function on this conveyor system this principle should be used. The preferred arrangement uses two redundant clutches: one strictly mechanical, the other magnetic with electric uncoupling elements.

The preferred most reliable mechanical clutch illustrated in FIGS. 18, 19 and 20 is described as follows: A coupling bar 80 is located at the end of the accelerating ramp such as 3B of FIG. 1. At this location the accelerated vehicle 6B is travelling very close to the track speed of the trolley 50 and is almost under it. This bar 80 acts as a cam, for a rotatable lever 81 on the vehicle. This lever is then a cam follower and is mounted on the cabin as follows. The lever 81 is on the same shaft 90 as two gear wheels 82 and coupling cams 88. Four pinions 83 are mounted on verticle shafts held by bearings 84, mounted on the cabin roof. The spindles 85 of the pinions 83 each has an internal nut 86 engaging one of the cabin supporting arms 87.

Each of these arms 87 has an extension 88 acting as a cam follower on a cam 89 (one for each arm). These cams 89 are all mounted on the horizontal shaft 90 which also carries the cam follower lever 81. The shaft 90 turns as shown (through about 90°) due to engagement between follower 81 and cam bar 80 while the vehicle travels the length of the cam bar 80. The turning shaft 90 turns the cams 89 to swing the arms 87 inward towards the trolley tray 92. The extension 88 of the arm 87 accomplishes this function.

Initially and during part of this turning, the arms are swinging above the level of the trolley tray 92. However the turning of the shaft 90 turns the gears 82 and thereby the four gear pinions 83. These pinions attached to the nuts 85, turn these nuts and force the arms 87 downwardly at a slow rate so as to engage definitely the edges of the tray 92. The hooks 93 (FIG. 19) at the ends of these arms are then firmly anchored on the tray and the coupling procedure is completed. The cabin then continues its travel suspended from the trolley tray 92.

The uncoupling at the destination of travel is achieved through the same mechanism as follows. An uncoupling bar 80 is located at the start of the exit ramp such as 3A of FIG. 1, but on the opposite side of the track 1A. As shown at the bottom of FIG. 18A, the cam follower lever 94 on this side of the cabin is normally in a horizontal position as shown but pulled back along a spline 95. In this position the lever 81 will clear all exit cams such as bar 80. The stations will be therefore bypassed. When approaching the destination station, however, a rack and pinion arrangement, as shown at 96 is activated, either by an electrical decoder such as 16 of FIG. 1, or by a mechanical lever 97 operated either directly by the passenger or by station decoding device 16. This operation precedes the arrival to the decoupling cam 80. The levers 81 and 94 are forced during coupling operation into vertical position. Therefore when the rack and pinion action places the lever 94 into engagement with the track cam 80, the coupling action is reversed into decoupling. The arms are then swung out to clear entirely the trolley. The cabin will then follow the exit ramp towards the exit guide rail as illustrated in FIG. 2.

The redundant magnetic clutch arrangement is shown in FIG. 21. The operation of this clutch is based on the use of ceramic magnets recently introduced into magnetic technology. A very similar application of this technology is described in my U.S. Pat. No. 3,446,321. This will be useful in understanding of operation of the magnetic clutch. Its operation assures constant very large holding forces due to the peculiar magnetic properties of the ceramic magnets. This holding force is removed for short but adequate duration by the application of an electric pulse as explained below. The magnet 101 is in the shape of a flat disc, magnetized, as shown by N & S at right angles to the flat surfaces.

An upper shell 102 and a lower shell 103 have flat surfaces contacting the upper and the lower magnet surfaces which are of opposite magnetic polarity (N & S). The concentric outside edges of these shells, all made of ferromagnetic material such as steel, form concentric pole pieces. The upper surfaces of these pole pieces are machined after assembly to be exactly in the same plane as that of the contacting surface of a ferromagnetic plate 105, which is an element of the propulsion or guidance trolley of the transport system, generally supported by some form of rails or travelling cable attachments.

Maximum attracting force exists between the contacting plate 105 and the pole pieces 102 and 103. Such maximum force is assured by the high magnetic retentivity of the ceramic magnet 101, and by the configuration of the shells which concentrate the magnetic field on the upper edges of the pole pieces 102 and 103, which contact the plate 105.

The loss of magnetic field due to magnetic leakage is minimized by making the concentric shells as short as possible in the axial direction (at right angles to the attracting area) and by the fact that shell shaped structure has very minute external magnetic leakage.

The release of the magnet from the trolley is achieved by the use of a demagnetizing coil 104. This coil is located between the two concentric pole pieces, as close as possible to the plate 105. There is a small empty place 107 below the coil between the shells. Although such space contributes some loss of magnetic field due to leakage, I have found it instrumental in shortening the duration of electric release pulse as explained below.

The outside shell 103 is fastened to the channel 109 supporting the roof of the cabin load 108 by a number of load carrying screws 110. There is also a central screw 106 made of non-magnetic material, such as certain grades of stainless steel. Its purpose is to assist in holding the magnet structure together.

The release mechanism operates as follows: a current pulse is applied to the demagnetizing coil 104 to create a magnetic field opposite to the magnetic field existing between shells 102 and 103 through plate 105. This disconnects the shells from the plate 105 and gravity will immediately start lowering the cabin with the magnet. The increasing air gap between the magnet shells 102 and 103 and the plate 105 will assure that at the end of the current pulse when the magnetization is restored in this airgap, the forces are too low to again raise the cabin.

The pulse for the operation of the release is generated in any of the well known manners of electrical engineering. For example, as shown in FIG. 21, a switching unit 113, operated either manually or by some automatic means, closes an electrical drive circuit of a pulse forming device 114, such as a multivibrator producing a single pulse of definite duration. The pulse is then amplified by the amplifier 115, to supply electrical energy via leads 111 to the release coil 104, to suppress the magnetic field at the pole surfaces, but not to reverse it. The electrical power supply of sufficient capacity to sustain the pulse of this short duration (112) activates also the pulse forming mechanism 114.

The magnetic clutch of the preferred reliable arrangement for attaching load containers to the conveyor trolleys is activated by the permanent magnet 101 and is therefore very reliable for initial attachment and subsequent holding. However the release mechanism depends on an electrical system. The redundant arrangement of the two clutches must therefore provide specially for the condition when the electrical circuit fails. It is assumed that initially both clutches are attached. The mechanical clutch will uncouple when the signal arrangement shown in FIG. 18B operates the rack and pinion 96 to bring the cam follower 81 into engagement with the uncoupling clutch cam bar 80 at the selected station.

Normally the magnetic clutch will receive the same signal and will accept the releasing electrical pulse. FIGS. 22 and 23 show the arrangement for releasing the magnetic clutch when the normal electrical release operation fails to function. FIG. 22 shows on the side of the magnetic clutch 100 a release cam 116, pivoting on a shaft 117, held firmly, but free to turn by bearings 118 and 119 on the clutch and on the roof 108 of the load container. This shaft has a helical gearing 120 to drive it from the operating shaft 90 of the mechanical clutch of FIG. 18 to 20. A pin clutch 121 separates normally the gear wheels 120 from the shaft 90. The clutch 121 is held open by a stiff leaf spring 122 attached to the rack of mechanism 96. Therefore the clutch 121 and the gearing is only activated when this rack is moved for engaging the cam follower 94 with the exit cam 80. This occurs only when a release signal has been received. Therefore at such time the release cam 116 of the magnetic clutch is operated to force the cabin load away from the trolley 92. A sufficient airgap between the magnetic clutch surface of 102N and 103S is provided to reduce substantially their attractive force to the magnetic plate 105 of the trolley 92 to achieve the needed unclutching of the load. The weight of the load completes this operation.

The automation arrangement of the conveyor of this invention includes in addition to the velocity control, described in reference to FIGS. 16 and 17, logistic controls, Such controls are generally of a well known variety of electric circuits, with stored information for different procedures and able to sequentially carry out the needed performance. This will include starting and stopping operations of loaded containers in accordance with manually preset directions, the selection of the exact time when an available trolley passes under the vehicle attachment mechanism, and certain program relations making the vehicles available for loading at certain times and the trolleys available for attaching to such vehicles in the most expedient logistic manner. An example of logistic control for several passengers commanding transportation to the same destination is presented below.

FIG. 24 is a schematic presentation of the keying arrangement for passenger control of their destination. The travel key 130 may be of metal with identifying coding projections 131. With 5 possible projections the number of identifiable stations will be $2^5-32$. If projections are provided on both sides of the key $2^{10}-1,024$ stations can be identified. In the arrangement shown in FIG. 24, each projection sets a switch driver 132 into close or open position. These switch drivers would project outside of the vehicle. At destination station they would close the selected switches 133. These are the identifying sensors 134 along the track set up for a definite combination of 5 or 10 elements or any other number of coding positions.

The output of the switches 133 and sensors 134 are electrically connected to a comparator 135, which activates the cabin release mechanism 136 only when there is direct correspondence between the preset code on switches and the preset code on the sensors.

In addition the key 130 may have start tabs 137, which activate a switch 139. This switch presets the vehicle start mechanism 139, so that when the automation logic provides an available trolley, the vehicle is released as explained in FIG. 16 and thereafter launched into starting acceleration.

FIG. 24 shows moreover an emergency or alarm control 140. An emergency button in the vehicle for this control will furnish the needed signal to the automated logic to release the vehicle at the next station. With passenger traffic at certain hours it becomes necessary to assure that each vehicle is filled before launching. FIG. 24 shows an interlocked keying arrangement 141. With 4 key slots, A,B,C,D the passengers must insert sequentially all keys before the start key D can be turned to activate the vehicle start mechanism 139. All of the passengers will then travel to the same destination and the vehicle must be identified at the entry station.

A manual or automatic control 142 will reset the interlock mechanism 141 to permit single or two passenger operation, when the expected travel density permits single passenger or two passengers per cabin.

The flexibility of traffic control permits the utilization of automated conveyor for the greatest convenience of passengers with due consideration to all prospective travellers at any time.

Figure 25:
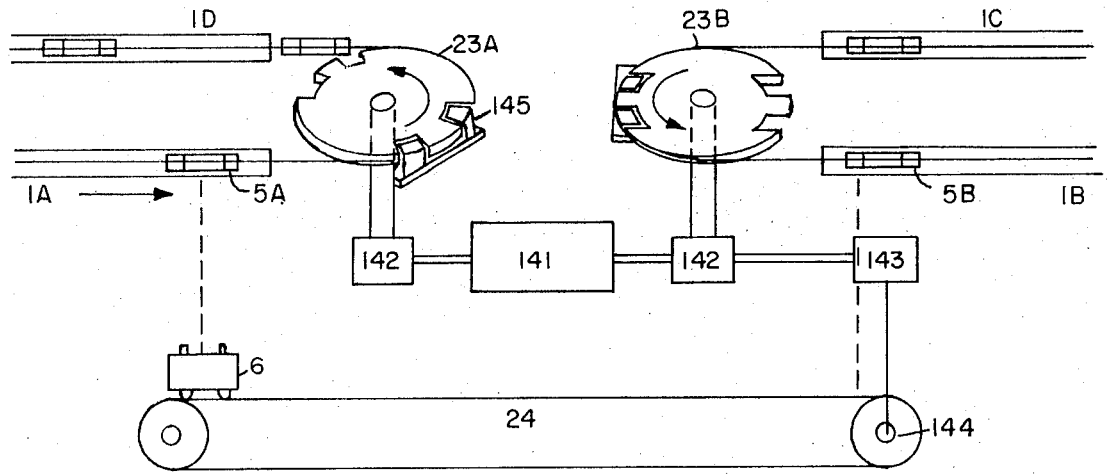
FIG. 25 illustrates the power boosters and transfer elements for a conveyor used for passenger travel.

FIG. 25 illustrates a booster for cable power in a form which may be preferred in a passenger application of the automated conveyor of this invention. FIG. 4 indicates the principal elements of this booster at station 4. It consists of a drive wheel 23A for cables on tracks 1A and 1D, and a drive wheel 23B for cables on tracks 1B and 1C. An electric motor 141 can be used to drive both wheels at the same speed through gear elements 142. When the redundant drive motors 9 (FIG. 2) are used on each of the traction trolleys 5, then it will be of advantage to use synchronous motors for 141 on the booster station and for all motors 9 on the trolleys. In this manner the two propulsion systems are truly redundant and the trolley motors will exercise strong restraint on any incipient oscillations of trolleys in the direction of travel.

In case an auxiliary diesel motor or steam engine is used as the drive motor 141, special provisions must be made that its operation is synchronous with the trolley motors 9. Such synchronizing arrangements are well known.

The motor 141 or a separate motor can be used also for the transfer track 24. This is the track described in connection with FIG. 4 for transferring the load vehicles from one cable drive to the next one, without loosing their synchronous operation. FIG. 25 shows the vehicle 6 released from trolley 5A on track 1A and picked up on trolley 5B of track 1B.

The track may be a belt travelling at the same speed as the vehicles on tracks 1A and 1B. When the vehicle 6 is placed on this belt with brakes locked, the vehicle will continue travelling at constant speed until automatically picked up on trolley 5B. The release from 5A and pick up on 5B will be carried out by the same mechanism as is used on exit ramps 3A and entry ramp 3B of FIG. 1.

The traction wheels 23A and 23B are designed with slots 145 to accomodate the trolleys which remain on the cables. These slots are separated on the circumference of the wheels at the same distance as the trolleys along the traction cable. This simple provision for the trolley illustrates the advantage of synchronous operation. To assure the synchronism of belt 24 transfer, the driving mechanism 144 of this belt may be propelled by the same motor 141 as for the drive wheels 23A and 23B.

When the layout of the conveyor traction calls for a change in speed as when the track changes from substantially horizontal to a definite upward grade, the transfer belt will still travel at the minimum track speed. However, the vehicle brakes will have automated controls similar to those described for FIG. 17. Thus the speed is lowered to a value suitable for a steeper track. The speed control record tape will assure that synchronism will be maintained, even as the trolleys on the steeper grade will travel slower and may be more closely spaced.

At the end of the steeper upward grade and on changing back to horizontal travel the transfer track will be a belt at the maximum track speed. This will permit the belt to accelerate the vehicles to the higher horizontal speed. The synchronism will be maintained again by the speed control tape 69 of FIG. 17.

Figure 26:
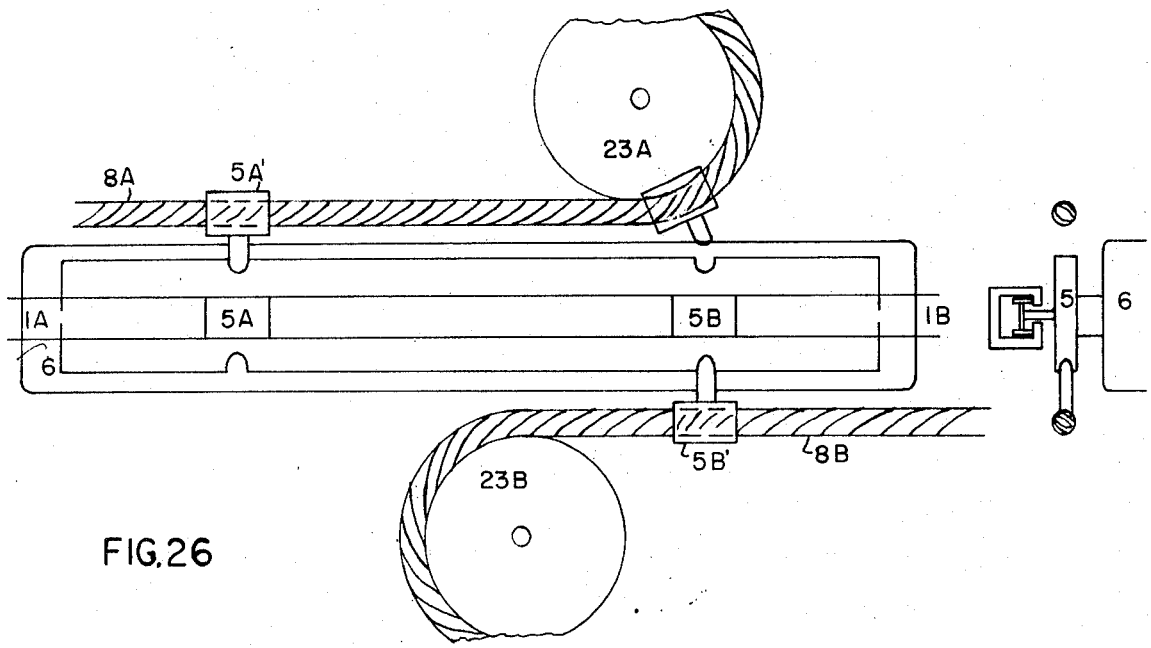
FIG. 26 illustrates a simplified power booster for Arctic operation of the conveyor system.

FIG. 26 shows a form of booster station which may be preferred for more exacting requirements of arctic operation. In this case, the schematic layout shows the load container vehicle 6 travelling on track 1A and being transferred to track 1B, which is merely the continuation of the same track. The vehicle need not be disconnected from its trolley but is successively engaged by belt portions 8A and 8B. However, the trolley 5A is to be connected to the propulsion cable 8, by a drive pin 5A' or some other mechanical or magnetic coupling device. As the cable advances towards the booster drive wheel 23A, the drive pin or the coupling device 5A' is disconnected, but not before another pin such as 5B' engages the same trolley from the other side. The vehicle is therefore under constant propulsion power and the transfer mechanism of belt 24 can be omitted. This arrangement will prove particularly useful on long hauls in the arctic, where the boosters can be completely automated between distant entry and exit stations.

The traction cable 8B for the track section 1B will have its own drive wheel 23B, which will operate synchronously with the wheel 23A. The return cable sections 8C and 8D, may be used on tracks 1C and 1D of FIG. 1 by suitable pulley arrangements. For automated arctic operations where the maximum redundancy and simplicity of mechanism is essential, the return sections 8C and 8D may very well be idle runs through suitably protected cable channels. At the preceding booster for 8A and the following booster for 8B there will be then redundant power supplied to these cables. A mechanical coupling interchange for two independent motors, for drive wheel 23A and 23B, will permit the operation of either motor on both wheels as selected by automated controls. This will provide another redundant element of drive.

It will be appreciated that various changes in the form and details of the above described preferred embodiment may be effected by persons of ordinary skill without departing from the true spirit and scope of the invention.

I claim:

1. A system for transporting a given load comprising:
    a substantially level track, consisting of rigid sections of uniform lengths, with individual support for each section;
    a plurality of transport units each of which is adapted to carry a relatively small portion of said load;
    a guide rail serving as propulsion track;
    a drive cable within said rail and a series of trolleys attached to said cable at distances approximating the length of each track section;
    a coupling element for each of said trolleys, whereby said transport units are attached to said trolleys and propelled by said cable, while the track loading per section is minimized by uniform load distribution among said section length distances.

2. The transport system as recited in claim 1, including a second track, and moving means between said tracks similar to said drive cable, located adjacent said two tracks, and means for moving said load containers to a location adjacent to a trolley on said second track for coupling to said trolley.

3. An automated system of transport as in claim 1 and a number of locations for loading said transport units, with automated means for such loading; said automated means being synchronized with the preset time sequence of said transport units, a feeder track associated with said principal track, comprising driving means for load units to be transported, means associated with said driving means for controlling the velocity of propulsion, and automation elements for such controls, whereby said load units are accelerated to the velocity of propulsion of said trolleys, and means for coupling said load units to said trolleys and detaching them from said driving means at the time determined by said automation elements.

4. A system of transport as in claim 1, wherein the sequence of track sections includes a change of forward grade either upward or downward;
- a second drive cable for the sections of changed grade;
- a drive for said second cable synchronized at a different speed from said first-mentioned cable, to allow for the change in propulsion drive force due to changed grade; and
- an intermediate transfer track, including speed changing devices, to maintain constant time headway between said transport units.

5. A transport system comprising elevated track, including rails; a chain of spaced trolleys supported on said track; a traction cable interconnecting said trolleys; with uniform spacing therebetween; means for moving said cable at constant speed; a plurality of load containers each of which is adapted to be attached to and moved by one of said trolleys; first means located adjacent said track, for moving a load container from a first stationary position to a location adjacent one of said trolleys, with means for approximating the speed of said trolley at the time of approach; means for attaching said load containers to the particular adjacent trolley at the time of approach at or near the speed of the trolley; second means, located adjacent said track, for moving said load containers from a position adjacent said trolley from said constant speed, to a second stationary position; and means for detaching said load containers from said respective trolleys prior to being moved to said second position; wherein there are a plurality of second moving means located adjacent said track and adapted to move said load containers to respective different second stationary position, wherein each said load container has an indication of the second stationary position it is to be moved to, and wherein said plurality of second moving means operate in response to said indication of said load containers.

6. A transport system as recited in claim 5 wherein each said second moving means comprises an array of successive elements, said array being located adjacent said track and at a location one of said load containers passes before reaching its second stationary position; a probe located on said load container said probe adapted to sense said elements as said container passes said array; means for storing a preset frequency program; means for comparing the frequency at which said probe senses said elements with said preset frequency; and means for controlling the velocity of said container so that said two frequencies match.

7. A system of transport as in claim 6 and a system of automation comprising electronic controls for activating and deactivating said attaching means, whereby individual transport vehicles can be inserted or removed from said cable traction.

8. A transport system comprising a sequence of frames of pyramidal form, joined to form a continuous two-way track, wherein one pyramidal corner includes load supporting rails, with another corner as a guide rail, said guide rail containing a sequence of trolleys, a traction cable interconnecting said trolleys and means for attaching said trolleys to a series of load containers supported by said rails.

9. A transport system as recited in claim 8 for moving a plurality of vehicles successively along the same path at constant speed, together with a plurality of redundant synchronous alternating propulsion motors constructed and arranged for propulsion of said vehicles independent of said traction cable, and means for energizing all of said motors by a common source of alternating current for exercising vibration stabilizing forces on said interconnected plurality of vehicles.

10. In a transport system including two alternative tracks, each with a chain of interconnecting vehicles, means for switching any one of said vehicles from one track to another comprising separate guide rails for each alternate track; cable-propelled trolleys in each of said guide rails; coupling means between said trolleys and said vehicles, and electric controls for activating said coupling means, whereby any one of said vehicles can be coupled to the trolleys on either of said guide rails, for the purpose of switching from one track to another, with wheels on said vehicles capable of engaging either of said tracks.

11. A transport system comprising an elevated track, including rails; a chain of spaced trolleys; a continuous traction cable interconnecting said trolleys with uniform spacing therebetween; means for moving said cable at a constant speed; a plurality of load containers, each of which is adapted to be attached to and moved by one of said trolleys; means located adjacent said track for moving a load container from a first stationary position to a location adjacent one of said trolleys, together with means for approximating the speed of said trolley at the time of approach; and means for attaching said load containers to the particular adjacent trolley at the time of approach at or near the speed of the trolley.

12. A transport system comprising elevated track, including rails; a chain of spaced trolleys supported on said track; a traction cable interconnecting said trolleys; means for moving said cable at constant speed; a plurality of load containers each of which is adapted to be attached to and moved by one of said trolleys; first means located adjacent said track, for moving a load container from a first stationary position to a location adjacent one of said trolleys, with means for approximating the speed of said trolley at the time of approach; means for attaching said load containers to the particular adjacent trolley at the time of approach at or near the speed of the trolley; second means located adjacent said track, for moving said load containers from a position adjacent said trolley from said constant speed, to a second stationary position; and means for detaching said load containers from said respective trolleys prior to being moved to said second position, wherein said track comprises a series of spaced triangular frames located in substantially vertical planes; a series of spaced pylons; means supporting said frames from said pylons such that some triangular frames are attached at one of their angles; and a sequence of pairs of rails, each pair spanning two or more frames, the rails of each pair being located at the remaining angles of said frames; and wherein said system further comprises means for guiding said chain of trolleys such that said chain moves long one of said rails, is turned and then moves along the other of said rails in the opposite direction.

13. A transport system comprising elevated track, including rails; a chain of spaced trolleys supported on said track; a traction cable interconnecting said trolleys; means for moving said cable at constant speed; a plurality of load containers each of which is adapted to be attached to and moved by one of said trolleys; first means located adjacent said track, for moving a load container from a first stationary position to a location adjacent one of said trolleys, with means for approximating the speed of said trolley at the time of approach; means for attaching said load containers to the particular adjacent trolley at the time of approach at or near the speed of the trolley; second means, located adjacent said track, for moving said load containers from a position adjacent said trolley from said constant speed, to a second stationary position; and means for detaching said load containers from said respective trolleys prior to being moved to said second position; wherein the track includes a box-like rail, a traction cable within said rail, a number of trolleys attached to said traction cable and propelled by it, and wherein said rail has a longitudinal slot, an arm extending from said trolley through said slot, load coupling elements on the outside of said arm; said trolley including one or more wheels to support and guide said trolley in said rail, and vibration damping means between said coupling elemnts and said wheels.

14. A transport system comprising elevated track, including rails; a chain of spaced trolleys supported on said track; a traction cable interconnecting said trolleys; means for moving said cable at constant speed; a plurality of load containers each of which is adapted to be attached to and moved by one of said trolleys; first means located adjacent said track, for moving a load container from a first stationary position to a location adjacent one of said trolleys, with means for approximating the speed of said trolley at the time of approach; means for attaching said load containers to the particular adjacent trolley at the time of approach at or near the speed of the trolley; second means, located adjacent said track, for moving said load containers from a position adjacent said trolley from said constant speed, to a second stationary position; and means for detaching said load containers from said respective trolleys prior to being moved to said second position; wherein said attaching means comprise a permanent magnet, a pair of pole pieces having their air gaps adapted to be placed adjacent said magnetically attractable element; and said detaching means comprising a bucking coil placed in close proximity of said airgaps; and means for energizing said bucking coil.

15. A transport system comprising elevated track, including rails; a chain of spaced trolleys supported on said track; a traction cable interconnecting said trolleys; means for moving said cable at constant speed; a plurality of load containers each of which is adapted to be attached to and moved by one of said trolleys; first means, located adjacent said track, for moving a load container from a first stationary position to a location adjacent one of said trolleys, with means for approximating the speed of said trolley at the time of approach; means for attaching said load containers to the particular adjacent trolley at the time of approach at or near the speed of the trolley; second means, located adjacent said track, for moving said load containers from a position adjacent said trolley from said constant speed, to a second stationary position; means for detaching said load containers from said respective trolleys prior to being moved to said second position; and means for controlling speed, wherein each said first moving means comprises an array of successive elements located along the path of said load containers from said first stationary position to a location adjacent one of said trolleys; a probe located on said load container and adapted to sense said elements as said container passes said array; means for storing a preset frequency program suitable for acceleration up to the speed of said trolley: and means for comparing the frequency at which said probe senses said elements with said preset frequency; and means for controlling the velocity of said container so that the two frequencies match when said container is adjacent said trolley.

* * * * *